United States Patent
Albrecht

(10) Patent No.: US 7,770,512 B2
(45) Date of Patent: *Aug. 10, 2010

(54) DISPOSABLE BREW BASKET FOR ELECTRIC COFFEE MAKER

(75) Inventor: Douglas A. Albrecht, St. Louis, MO (US)

(73) Assignee: Courtesy Products, LLC, St. Louis, MO (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/519,620

(22) Filed: Sep. 12, 2006

(65) Prior Publication Data

US 2007/0000390 A1    Jan. 4, 2007

Related U.S. Application Data

(60) Continuation-in-part of application No. 10/942,766, filed on Sep. 16, 2004, now Pat. No. 7,311,037, which is a division of application No. 10/136,543, filed on May 1, 2002, now Pat. No. 7,081,263.

(51) Int. Cl.
*A47J 31/00* (2006.01)
*B65B 29/02* (2006.01)

(52) U.S. Cl. .............................. 99/295; 99/323; 99/306; 99/307; 426/82; 426/115

(58) Field of Classification Search .................. 99/306, 99/307, 323, 295; 426/77, 78, 79, 82, 112, 426/115, 106, 108
See application file for complete search history.

(56) References Cited

U.S. PATENT DOCUMENTS

| | | |
|---|---|---|
| 1,412,388 A | 4/1922 | Clermont |
| 1,555,515 A | 9/1925 | Peal |
| 2,383,144 A | 8/1945 | Moore |

(Continued)

FOREIGN PATENT DOCUMENTS

DE    23 27 264 A1    1/1975

(Continued)

OTHER PUBLICATIONS

The Keurig Premium Coffee System, 7 pgs.

*Primary Examiner*—Reginald L Alexander
(74) *Attorney, Agent, or Firm*—Dean Small; Small Patent Law Group

(57) ABSTRACT

An apparatus for use in a beverage brewing machine includes a filter pack containing an amount of grinds to brew approximately only a single serving of brewed beverage, a single serving disposable brew basket including a body defining a brewing reservoir. The body is formed with a disposable rigid construction. The body has an opening therethrough to permit a brewed beverage to flow from the brewing reservoir of the disposable brew basket into a beverage container. The body extends upwardly from a bottom of the brewing reservoir to an open top that is configured to receive heated water from the brewing machine. The heated water flows through the open top during a brewing operation. The brewing reservoir has a size dimensioned appropriate to make approximately only a single serving of beverage during a single brewing operation. The brewing area is sufficiently large to hold the filter pack and the heated water while brewing without a level of the heated water rising above and overflowing the open top.

73 Claims, 13 Drawing Sheets

U.S. PATENT DOCUMENTS

| | | | |
|---|---|---|---|
| 2,438,844 A | 3/1948 | Dale | |
| 2,615,384 A | 10/1952 | Ranz | |
| 2,672,531 A | 3/1954 | Stevenson | |
| 2,676,531 A | 4/1954 | Popeil | |
| 2,732,787 A | 1/1956 | Osborne | |
| 2,791,367 A | 5/1957 | Mefford | |
| 2,822,273 A | 2/1958 | Anderson | |
| 2,899,310 A | 8/1959 | Dale | |
| 2,968,560 A | 1/1961 | Goros | |
| 3,083,101 A | 3/1963 | Noury | |
| 3,091,360 A | 5/1963 | Edwards | |
| 3,094,917 A | 6/1963 | Rombouts | |
| 3,139,344 A | 6/1964 | Weisman | |
| 3,292,527 A | 12/1966 | Stasse | |
| 3,320,073 A | 5/1967 | Devaris et al. | |
| 3,343,943 A | 9/1967 | Billue | |
| 3,345,935 A | 10/1967 | Waline | |
| 3,384,004 A | 5/1968 | Perlman et al. | |
| 3,401,827 A | 9/1968 | Messina | |
| 3,411,431 A | 11/1968 | Moerlini et al. | |
| 3,434,589 A | 3/1969 | Valtri et al. | |
| 3,445,237 A | 5/1969 | Gidge | |
| 3,446,624 A | 5/1969 | Luedtke | |
| 3,450,024 A | 6/1969 | Martin | |
| 3,481,501 A | 12/1969 | Anderson | |
| 3,511,166 A | 5/1970 | Bixby, Sr. | |
| 3,561,349 A | 2/1971 | Endo et al. | |
| 3,566,772 A | 3/1971 | Oliver et al. | |
| 3,599,557 A | 8/1971 | Leal | |
| 3,610,132 A | 10/1971 | Martin et al. | |
| 3,620,155 A | 11/1971 | Bixby, Jr. | |
| 3,658,615 A | 4/1972 | Amberg | |
| D225,077 S | 11/1972 | Martin et al. | |
| 3,795,182 A | 3/1974 | Van Damme | |
| 3,823,656 A | 7/1974 | Vander Veken | |
| 3,935,318 A | 1/1976 | Mihailide | |
| 3,938,695 A | 2/1976 | Ruff | |
| 3,943,058 A | 3/1976 | Wurm | |
| 3,983,797 A | 10/1976 | Wurm | |
| 3,985,069 A | 10/1976 | Cavalluzzi | |
| 4,086,848 A | 5/1978 | Hahn | |
| 4,123,228 A | 10/1978 | Frei | |
| 4,136,202 A | 1/1979 | Favre | |
| 4,149,454 A | 4/1979 | Kemp | |
| 4,167,899 A | 9/1979 | McCormick | |
| 4,214,673 A | 7/1980 | Heath et al. | |
| 4,382,402 A * | 5/1983 | Alvarez | 99/295 |
| 4,389,925 A | 6/1983 | Piana | |
| 4,446,158 A | 5/1984 | English et al. | |
| 4,471,689 A | 9/1984 | Piana | |
| 4,487,114 A | 12/1984 | Abdenour | |
| 4,520,716 A | 6/1985 | Hayes | |
| 4,550,024 A | 10/1985 | Le Granse | |
| 4,584,101 A | 4/1986 | Kataoka | |
| D286,006 S | 10/1986 | Kataoka | |
| 4,656,932 A | 4/1987 | Kopp | |
| 4,697,503 A | 10/1987 | Okabe et al. | |
| 4,704,954 A | 11/1987 | Mollenhoff | |
| 4,717,016 A * | 1/1988 | Dalgleish | 206/0.5 |
| 4,728,281 A | 3/1988 | McGuffin et al. | |
| 4,746,519 A | 5/1988 | Wright et al. | |
| 4,860,645 A | 8/1989 | Van der Lijn et al. | |
| 4,867,993 A | 9/1989 | Nordskog | |
| 4,948,601 A | 8/1990 | Serbu | |
| 4,995,310 A * | 2/1991 | van der Lijn et al. | 99/295 |
| 5,028,328 A | 7/1991 | Long | |
| 5,036,755 A | 8/1991 | Abdenour | |
| 5,063,838 A | 11/1991 | Matuschek | |
| 5,190,653 A | 3/1993 | Herrick | |
| 5,242,702 A | 9/1993 | Fond | |
| 5,243,164 A | 9/1993 | Erickson | |
| 5,267,507 A | 12/1993 | Enomoto | |
| 5,287,797 A | 2/1994 | Grykiewicz et al. | |
| 5,325,765 A | 7/1994 | Sylvan et al. | |
| 5,337,653 A | 8/1994 | Sellers | |
| 5,340,597 A * | 8/1994 | Gilbert | 426/433 |
| 5,398,596 A | 3/1995 | Fond | |
| 5,424,083 A | 6/1995 | Lozito | |
| 5,632,193 A | 5/1997 | Shen | |
| 5,771,777 A | 6/1998 | Davis | |
| 5,824,218 A | 10/1998 | Gasser | |
| 5,840,189 A | 11/1998 | Sylvan | |
| D408,679 S | 4/1999 | Potts | |
| 5,902,620 A * | 5/1999 | Nolan | 426/241 |
| 5,948,455 A | 9/1999 | Schaeffer et al. | |
| 5,952,028 A | 9/1999 | Lesser | |
| 5,967,019 A | 10/1999 | Johnson et al. | |
| 6,038,963 A | 3/2000 | Patterson et al. | |
| 6,076,450 A | 6/2000 | DiGiorgio, Jr. | |
| 6,079,315 A | 6/2000 | Beaulieu | |
| 6,079,318 A | 6/2000 | Davis | |
| 6,082,247 A | 7/2000 | Beaulicu | |
| 6,117,471 A | 9/2000 | King | |
| 6,142,063 A | 11/2000 | Beaulieu | |
| 6,164,191 A | 12/2000 | Liu et al. | |
| 6,182,554 B1 | 2/2001 | Beaulieu | |
| 6,245,371 B1 | 6/2001 | Gutwein et al. | |
| 6,298,771 B1 * | 10/2001 | Calvento | 99/323 |
| D452,433 S | 12/2001 | Lazaris | |
| D452,434 S | 12/2001 | Sweeney | |
| 6,440,256 B1 | 8/2002 | Gordon | |
| D462,865 S | 9/2002 | Honan | |
| 6,468,332 B2 | 10/2002 | Goglio | |
| D474,110 S | 5/2003 | Sweeney | |
| D474,111 S | 5/2003 | Lazaris | |
| 6,589,577 B2 | 7/2003 | Lazaris | |
| 6,606,938 B2 | 8/2003 | Taylor | |
| 6,607,762 B2 | 8/2003 | Lazaris | |
| 6,644,173 B2 | 11/2003 | Lazaris | |
| 6,645,537 B2 | 11/2003 | Sweeney | |
| 6,655,260 B2 | 12/2003 | Lazaris | |
| 6,658,989 B2 | 12/2003 | Sweeney | |
| 6,666,130 B2 | 12/2003 | Taylor | |
| 6,672,200 B2 | 1/2004 | Duffy | |
| 6,708,600 B2 | 3/2004 | Winkler | |
| D489,215 S | 5/2004 | Honan | |
| 6,758,130 B2 | 7/2004 | Sargent | |
| 6,805,041 B2 * | 10/2004 | Colston et al. | 99/295 |
| 6,810,788 B2 | 11/2004 | Hale | |
| D502,362 S | 3/2005 | Lazaris | |
| 6,887,599 B2 | 5/2005 | Reiser et al. | |
| D513,572 S | 1/2006 | Schaffeld | |
| 7,081,263 B2 | 7/2006 | Albrecht | |
| 7,127,983 B2 | 10/2006 | Huda | |
| 7,150,219 B2 | 12/2006 | De'Longhi | |
| 7,165,488 B2 | 1/2007 | Bragg | |
| D544,299 S | 6/2007 | Schaffeld | |
| 7,347,138 B2 | 3/2008 | Bragg | |
| 7,360,418 B2 | 4/2008 | Pelovitz | |
| 7,377,162 B2 | 5/2008 | Lazaris | |
| 7,398,726 B2 | 7/2008 | Streeter | |
| 7,513,192 B2 | 4/2009 | Sullivan et al. | |
| 7,523,695 B2 | 4/2009 | Streeter | |
| 7,543,527 B2 | 6/2009 | Schmed | |
| 7,552,672 B2 | 6/2009 | Schmed | |
| 2002/0144603 A1 | 10/2002 | Taylor | |
| 2005/0287251 A1 | 12/2005 | Lazaris | |
| 2006/0169149 A1 | 8/2006 | Voss | |
| 2006/0174773 A1 | 8/2006 | Taylor | |
| 2006/0288776 A1 | 12/2006 | Pelovitz | |
| 2006/0288777 A1 | 12/2006 | Lazaris | |
| 2006/0292012 A1 | 12/2006 | Brudevold | |
| 2007/0056994 A1 | 3/2007 | Woodnorth | |
| 2007/0186784 A1 | 8/2007 | Liverani | |

| | | | | | | |
|---|---|---|---|---|---|---|
| 2007/0221066 | A1 | 9/2007 | Sullivan | FR | 2 556 323 | 12/1983 |
| 2007/0221570 | A1 | 9/2007 | Aregger | GB | 1064010 | 4/1967 |
| 2008/0026121 | A1 | 1/2008 | Mastropasqua | GB | 2 023 086 A | 12/1979 |
| 2008/0095904 | A1 | 4/2008 | Sullivan | GB | 2123685 A | 2/1984 |
| 2008/0115674 | A1 | 5/2008 | Huang | WO | WO-0051478 | 9/2000 |
| 2008/0134902 | A1 | 6/2008 | Zimmerman | WO | WO-01/58786 A1 | 8/2001 |
| 2008/0257165 | A1 | 10/2008 | Bolzicco | WO | WO-01/60220 A1 | 8/2001 |
| | | | | WO | WO-2005/120314 A1 | 12/2005 |
| | FOREIGN PATENT DOCUMENTS | | | WO | WO-2007/072413 A2 | 6/2007 |
| DE | 35 04 441 A1 | 8/1986 | | WO | WO-2008/126045 A1 | 10/2008 |
| EP | 0334573 B1 | 2/1993 | | WO | WO-2009/114119 A1 | 9/2009 |
| EP | 01101430 A1 | 5/2001 | | | | |
| EP | 1980501 A1 | 10/2008 | | | | |

* cited by examiner

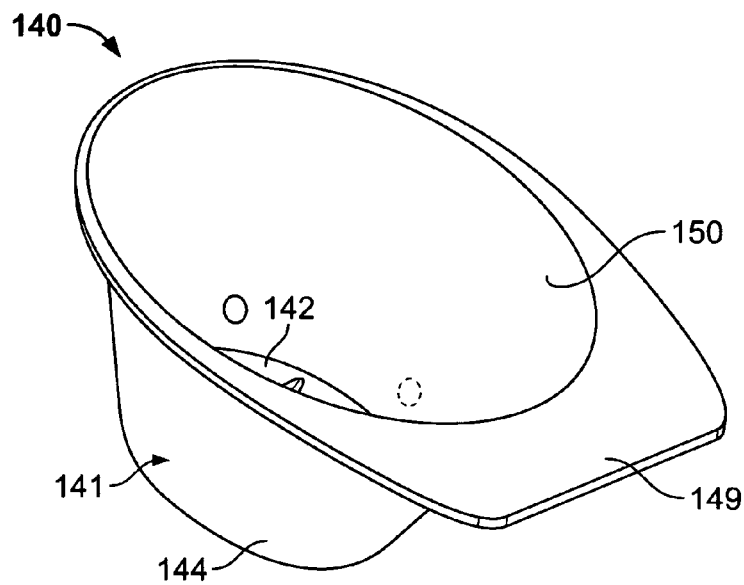
FIG. 12
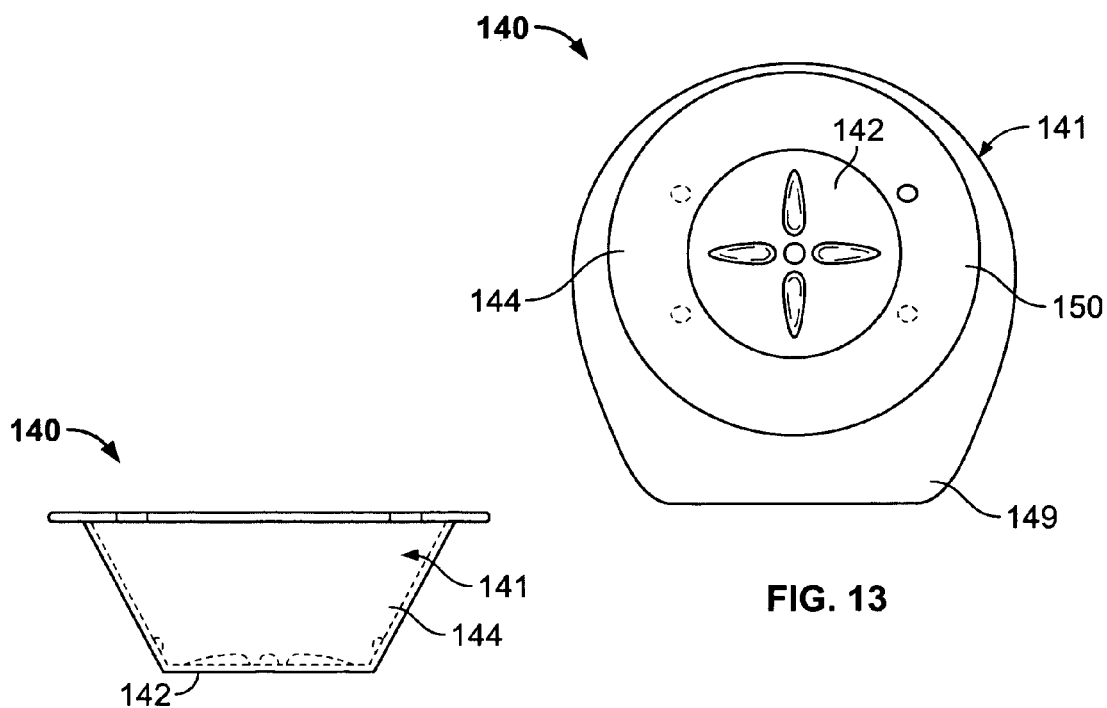
FIG. 13
FIG. 14

DISPOSABLE BREW BASKET FOR ELECTRIC COFFEE MAKER

CROSS REFERENCE TO RELATED APPLICATIONS

This application is a Continuation-in-Part Application of U.S. application Ser. No. 10/942,766, filed Sep. 16, 2004 now U.S. Pat. No. 7,311,037, which is a divisional application of U.S. application Ser. No. 10/136,543, filed May 1, 2002 now U.S. Pat No. 7,081,263, which are both hereby incorporated by reference in their entirety.

BACKGROUND

The present invention relates to electric coffee brewing machines. More particularly, the present invention relates to a novel disposable brew basket for a coffee maker.

For years, drip-type electric brewing machines have been used as an efficient means for making coffee. In general, these electric coffee brewing machines include a cold water reservoir, an electric resistance heating element for heating the water, and a reusable plastic brew basket for holding ground coffee in a paper coffee filter. To make coffee, cold water is poured into the water reservoir and ground coffee is placed in a coffee filter, which is in turn placed in the brew basket. The cold water is heated by the electric heating element, and the heated water then saturates the ground coffee. The brewed coffee then drips through the filter out of the brew basket, and into a receiving vessel, e.g., a coffee pot, which is positioned below the brew basket. After brewing is complete, the paper filter and used coffee grounds are taken out of the plastic brew basket and discarded. Then, the brew basket and coffee pot are cleaned for re-use.

While such drip coffee makers are relatively fast and efficient, the process of cleaning the plastic brew basket and coffeepot after each use is time consuming. Moreover, if the brew basket and coffee pot are not cleaned regularly, the quality and taste of the brewed coffee is compromised. A related problem occurs when such drip coffee makers are used to brew flavored coffee. Unless the brew basket and coffee pot are cleaned thoroughly, the taste and strong scent of flavored coffee tends to linger in the brew basket and coffee pot and can be detected when these components are reused to brew coffee of a different flavor. While these concerns alone have not been significant enough to deter individuals from using drip-type electric coffee makers at home, these drawbacks are multiplied in the hotel industry, where such coffee makers are often provided by hotels for daily in-room use by their thousands of guests. The task of regularly cleaning the thousands of brew baskets and coffee pots is left to the housekeeping or other hotel staff, an expensive, time-consuming task. Thus, there is a need to simplify maintenance of drip-type electric coffee brewing machines, especially in the context of the hotel industry, where thousands of such machines are used daily by hotel guests.

SUMMARY

In one aspect, an apparatus is provided for use in a beverage brewing machine. The apparatus includes a filter pack containing an amount of grinds to brew approximately only a single serving of brewed beverage, and a single serving disposable brew basket including a body defining a brewing reservoir. The body is formed with a disposable rigid construction. The body has an opening therethrough to permit a brewed beverage to flow from the brewing reservoir of the disposable brew basket into a beverage container. The body extends upwardly from a bottom of the brewing reservoir to an open top that is configured to receive heated water from the brewing machine. The heated water flows through the open top during a brewing operation. The brewing reservoir has a size dimensioned appropriate to make approximately only a single serving of beverage during a single brewing operation. The brewing area is sufficiently large to hold the filter pack and the heated water while brewing without a level of the heated water rising above and overflowing the open top.

In another aspect, a beverage brewing system is provided. The system includes a beverage brewing machine having a housing, a water reservoir, and a location to receive a brew basket. The brewing machine heats water from the water reservoir. The system also includes a plurality of filter packs. Each filter pack contains an amount of grinds sufficient to brew approximately only a single serving of beverage. The system also includes a plurality of single serving disposable brew baskets utilized with the beverage brewing machine during separate brewing operations. Each of the brew baskets is inserted into the location during an associated brewing operation. Each brew basket includes a body defining a brewing reservoir. The body is formed with a disposable rigid construction. The body has an opening therethrough to permit a brewed beverage to flow from the brewing reservoir of the disposable brew basket into a beverage container. The body extends upwardly from a bottom of the brewing reservoir to an open top that is configured to receive heated water from the brewing machine. The heated water flows through the open top during a brewing operation. The brewing reservoir has a size dimensioned appropriate to make approximately only a single serving of beverage during a single brewing operation. The brewing area is sufficiently large to hold the filter pack and the heated water while brewing without a level of the heated water rising above and overflowing the open top.

BRIEF DESCRIPTION OF THE DRAWINGS

FIG. 12 is a perspective view of an alternative embodiment of a disposable brew basket consistent with the present invention;

FIG. 13 is a top plan view of the disposable brew basket of FIG. 12;

FIG. 14 is a front elevational view of the disposable brew basket of FIG. 12;

Figure 1:
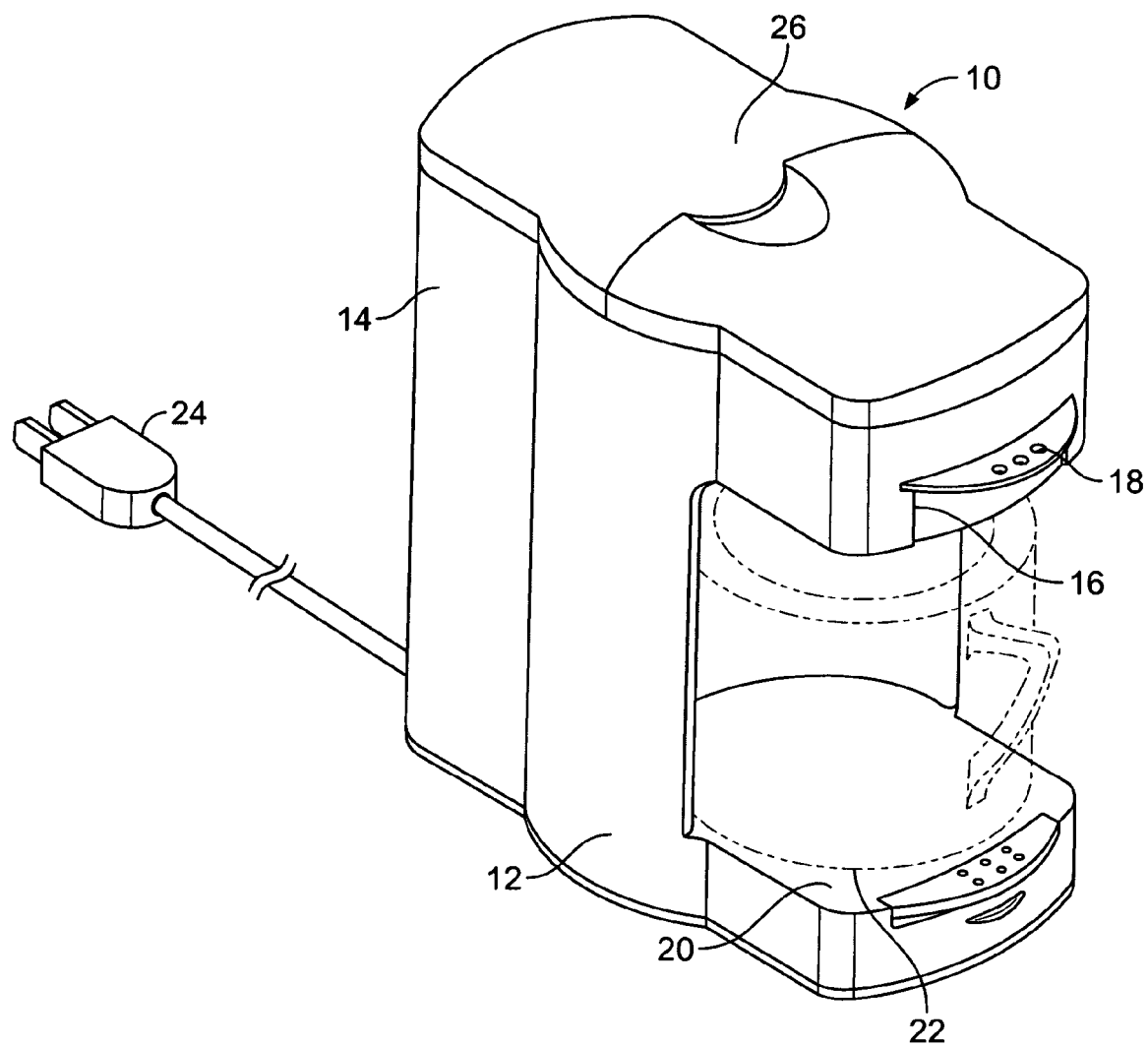
FIG. 1 is a perspective view of an exemplary electric coffee brewing machine used in the practice of embodiments consistent with the present invention.

Reference characters used in these drawings correspond with reference characters used throughout the Detailed Description, which follows. These drawings, which are incorporated in and form a part of the specification, illustrate embodiments consistent with the present invention and, together with the description, serve to explain the principles of the embodiments consistent with the present invention.

DETAILED DESCRIPTION

A drip-type electric coffee brewing machine used in the practice of embodiments consistent with the present invention is represented generally in FIG. 1 by the reference numeral 10. In general, the machine 10 comprises an outer housing 12, a cold water reservoir 14, a basket-receiving recess 16, a brew basket 18, a receiving vessel platform 20 for supporting a coffee-receiving vessel, such as a coffee pot or coffee cup 22, and an electric power cord 24. The outer housing 12 may include any suitable material(s) that enables the housing 12 to function as described herein, such as, but not limited to, plastic. In some respects, the electric coffee machine 10 is similar to conventional drip-type electric coffee brewing machines. To make coffee, a lid 26 to the cold water reservoir 14 is lifted and cold water (not shown) is poured into the reservoir 14. An appropriate amount of ground coffee (not shown) is placed in a paper coffee filter (not shown), which is in turn placed in the brew basket 18. The cold water is heated by an electric heating element (not shown) housed in the machine 10, and the heated water then flows into the brew basket 18 and saturates the ground coffee contained therein. Brewed coffee then drips out into the receiving vessel 22, for example a coffee cup, which is positioned immediately below the brew basket 18.

The brew basket 18 shown in FIG. 1 is conventional and may be made of injection molded plastic or another suitable material that is durable and corrosion resistant. The brew basket 18 shown in FIG. 1 can be reused many times, as is well known in the art. After brewing is complete, the paper filter and used coffee grounds are taken out of the reusable brew basket 18 and discarded. Then, the brew basket 18 must be cleaned for re-use.

Figure 2:
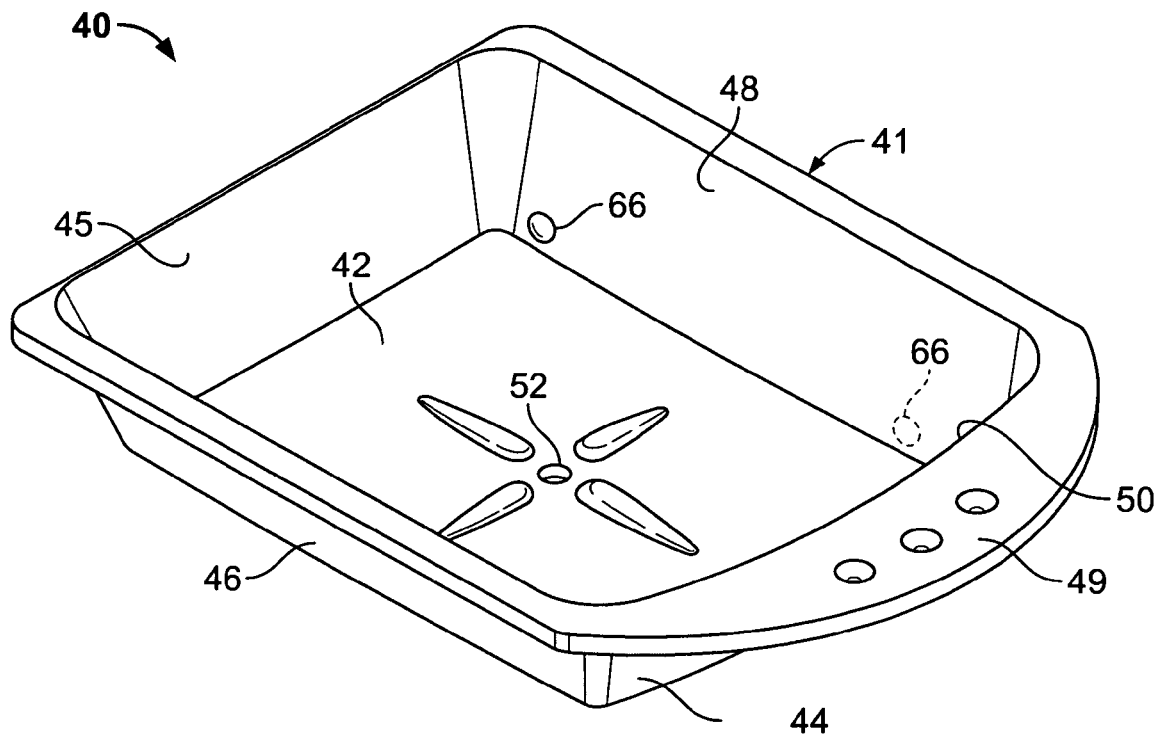
FIG. 2 is a perspective view of an exemplary embodiment of a disposable brew basket consistent with the present invention.
Figure 3:
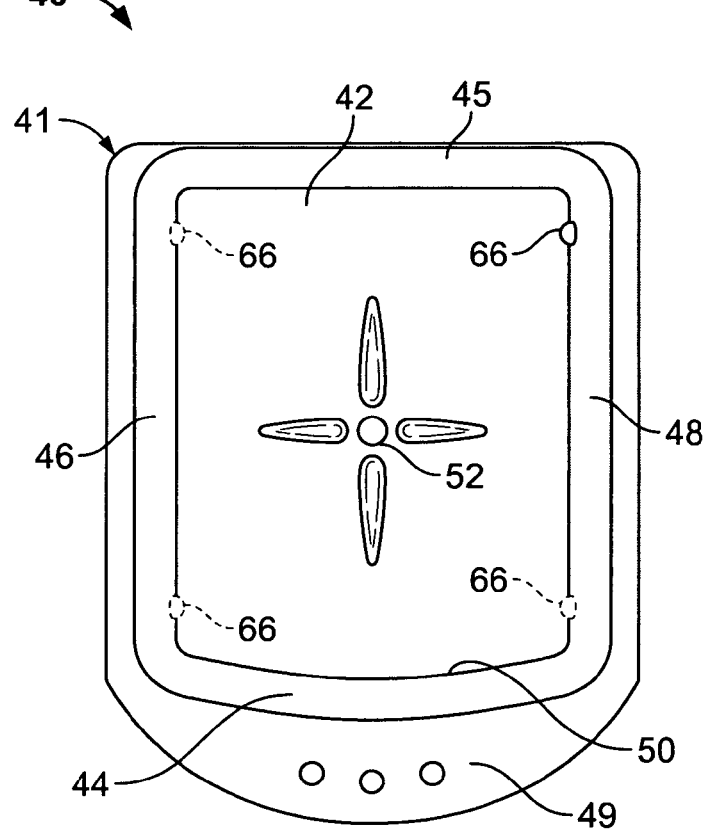
FIG. 3 is a top plan view of the disposable brew basket of FIG. 2.
Figure 4:
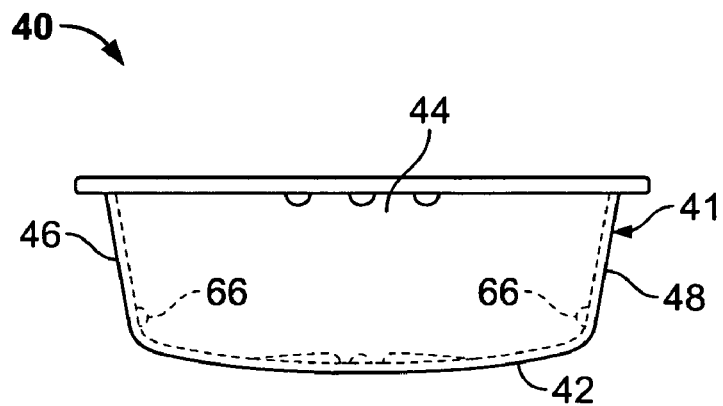
FIG. 4 is a front elevational view of the disposable brew basket of FIG. 2.
Figure 5:
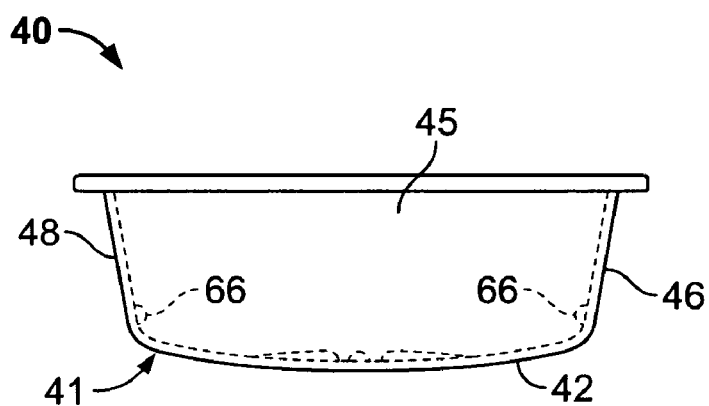
FIG. 5 is a rear elevational view of the disposable brew basket of FIG. 2.
Figure 6:
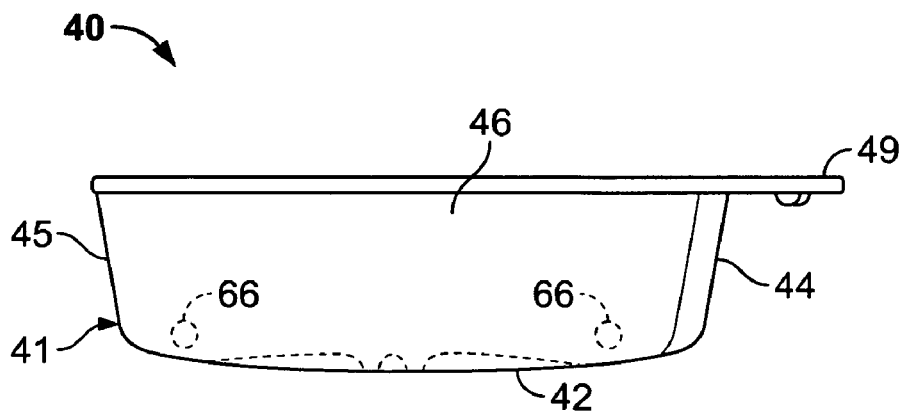
FIG. 6 is a left side elevational view of the disposable brew basket of FIG. 2.
Figure 7:
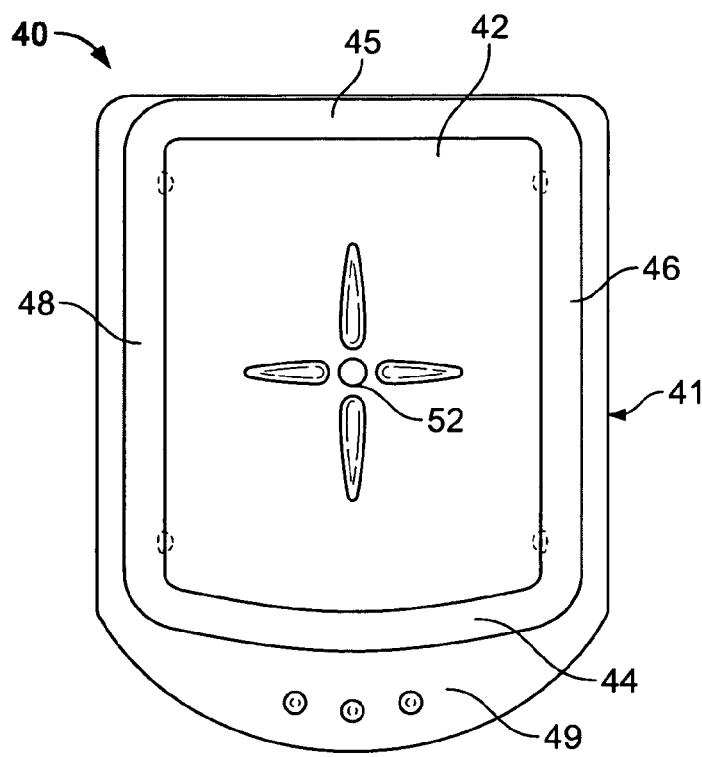
FIG. 7 is a bottom plan view of the disposable brew basket of FIG. 2.

FIGS. 2 through 9 show an exemplary embodiment of a disposable brew basket 40 consistent with the present invention. The disposable brew basket 40 may be shaped and dimensioned to fit within the basket-receiving recess 16 of the electric coffee machine 10, in lieu of the reusable brew basket 18. Although the disposable brew basket 40 may have any suitable shape that enables it to function as described and illustrated herein, as shown in FIGS. 2 through 9, the disposable brew basket 40 has a body 41 that has a generally rectangular shape with a bottom wall 42. More specifically, the disposable brew basket 40 shown in FIGS. 2-9 has the bottom wall 42, a front wall 44, a rear wall 45, a left side wall 46 and a right sidewall 48. The front, rear, left and right side walls are arranged in a generally rectangular shape and extend generally upwardly from the bottom wall 42 to define a brewing reservoir 50 having a generally rectangular cross-sectional shape for holding coffee grounds and for receiving heated water from the electric coffee brewing machine 10. The brewing reservoir 50 may alternatively be used to hold grounds or other materials used to make other beverages, such as, but not limited to, tea and/or hot chocolate. As shown in FIGS. 2, 3 and 7, the bottom wall 42 of the basket 40 may have a single, central opening 52 or "drip spout" to permit brewed coffee to flow from the brewing reservoir 50 of the disposable brew basket 40 and into the receiving vessel 22 (FIG. 1). The disposable brew basket 40 includes a lip 49 extending from the front wall 44 to facilitate grasping the basket 40 for generally holding the basket 40, as well as inserting the basket 40 within, and removing the basket 40 from, the basket-receiving recess 16. Alternatively, the disposable brew basket 40 does not include the lip 49.

The bottom wall 42, the front wall 44, the rear wall 45, the left side wall 46, the right side wall 48, and the lip 49 may be of a monolithic rigid construction. That is, the bottom wall 42, the front wall 44, the rear wall 45, the left side wall 46, the right side wall 48, and the lip 49 may be formed as a single piece. Alternatively, the bottom wall 42, the front wall 44, the rear wall 45, the left side wall 46, the right side wall 48, and the lip 49 may be formed from multiple pieces, such as, but not limited to, two pieces. The multiple pieces may be permanently and rigidly secured to one another. For example, the multiple pieces may be fused together, welded together, bonded together using any suitable adhesive, and/or secured to one another using another suitable method and/or means that enables the disposable brew basket 40 to function as described herein. The disposable brew basket 40 may be made from any suitable material(s) that form a rigid construction. One example of a material suitable for making the disposable brew basket 40 is vacuum formed high-impact polystyrene, which may be relatively inexpensive, may be generally easy to work with in manufacturing, and may produce a sufficiently strong product with a minimum thickness of material. However, other disposable materials having similar qualities could be used without departing from the scope of embodiments consistent with the present invention. For example, the disposable brew basket 40 may be formed, at least partially, from a metal or a composite of different metals, for example by stamping the brew basket 40 out of a sheet of metal(s) or by laminating a foil of one or more metals, referred to herein as a metallic foil, with one or more other materials, such as, but not limited to, paper and/or plastic. The disposable brew basket 40 may be stamped out of the sheet of metal(s) as a single piece. Alternatively, the walls 42, 44, 45, 46, and/or 48, or portions thereof, may be separately stamped out one or more sheets of metal(s) and thereafter joined together to form the disposable brew basket 40. The sheet of metal(s) may have a thickness selected to provide a predetermined rigidity to the disposable brew basket 40. Such a selected thickness may depend upon the properties of the particular metal(s) selected.

Similarly, a thickness of the material(s) laminated with the metallic foil may be selected to support the foil to provide a predetermined rigidity to the disposable brew basket 40. The metallic foil and other material(s) may be laminated together in any suitable configuration and/or arrangement. For example, the other material(s) may form the core structure of walls 42, 44, 45, 46, and/or 48, and the metallic foil may be laminated on an interior side of walls 42, 44, 45, 46, and/or 48 to provide the disposable brew basket 40 with a non-porous surface within the brewing reservoir 50, whether or not the other material(s) are porous. The non-porous surface within the brewing reservoir 50 may prevent water and/or brewed coffee from flowing through walls 42, 44, 45, 46, and/or 48, such that the water and/or brewed coffee instead flows from the brewing reservoir 50 into the receiving vessel 22 through the central opening 52. The metallic foil may also be laminated on an exterior side of walls 42, 44, 45, 46, and/or 48 to provide structure, support, and/or non-porosity thereto.

One example of a suitable metal for making the disposable brew basket 40 is aluminum, although the disposable brew basket 40 is not limited to being made therefrom. Aluminum may be selected as a material of the disposable brew basket 40 because of its cost and/or weight relative to some other metals. However, any suitable metal or combination of metals that enables the disposable brew basket 40 to function as described and illustrated herein may be used to form the disposable brew basket 40, for example based on the properties, composition, cost, and/or convenience thereof.

Another example of materials that may be used to make the disposable brew basket 40 with a rigid construction includes paper that is at least partially impregnated and/or coated with one or more materials that facilitate providing the disposable brew basket 40 with a non-porous surface within the brewing reservoir 50 and/or other portions of walls 42, 44, 45, 46, and/or 48. The paper may be any suitable type of paper that enables the disposable brew basket 40 to function as described and illustrated herein. The type of paper and its thickness may each be selected to provide a predetermined rigidity to the disposable brew basket 40. The material(s) impregnated within, and/or coating, the paper may be any suitable material(s) that enables the disposable brew basket to function as described and illustrated herein, and that facilitates providing non-porosity to all or a portion of the disposable brew basket 40, such as, but not limited to, plastic and/or wax. The material impregnated within, and/or coating, the paper may also provide structure and/or support to the paper to facilitate providing the disposable brew basket 40 with the predetermined rigidity.

Another example of materials that may be used to make the disposable brew basket 40 includes one or more plastics and/or other polymers. For example, the disposable brew basket 40 may be formed from one or more thermoplastics, such as, but not limited to, acrylonitrile butadiene styrene (ABS), acrylic, celluloid, ethylene vinyl alcohol (EVAL), fluoroplastics, ionomers, liquid crystal polymer (LCP), polyacetal (POM), polyacrylates, polyamide (PA), polyamide-imide (PAI), polyaryletherketone (PAEK), polybutylene terephthalate (PBT), polyethylene terephthalate (PET), polycarbonate (PC), polyketone (PK), polyester, polyethylene, polyetheretherketone (PEEK), polyetherimide (PEI), polyimide (PI), polylactic acid (PLA), polypropylene (PP), polystyrene (PS), polysulfone (PSU), and/or polyvinyl chloride (PVC). Another example of plastics and/or other polymers that may be used to make the disposable brew basket 40 includes one or more expanded and/or extruded polymers. For example, one or more expanded plastics, sometimes referred to as foamed plastics, may be used to make the disposable brew basket 40, such as, but not limited to, expanded polystyrene. Extruded plastics, such as, but not limited to, extruded polystyrene, are other examples of polymers that may be used to make the disposable brew basket 40. Still other examples of plastics or other polymers that may be used to make the disposable brew basket 40 include thermosets, such as, but not limited to, phenol formaldehyde resin, duroplast, polyester resin, and/or epoxy resin.

The formed plastic(s) and/or other polymer(s) may have a thickness selected to provide a predetermined rigidity to the disposable brew basket 40. Such a selected thickness may depend upon the properties of the particular plastic(s) and/or polymer(s) selected. Any suitable plastic(s), polymer(s), thermoplastic(s), thermoset(s), extruded polymer(s), and/or expanded polymer(s) that enables the disposable brew basket 40 to function as described and illustrated herein may be used to form the disposable brew basket 40, for example based on the properties, composition, cost, and/or convenience thereof.

Figure 8:
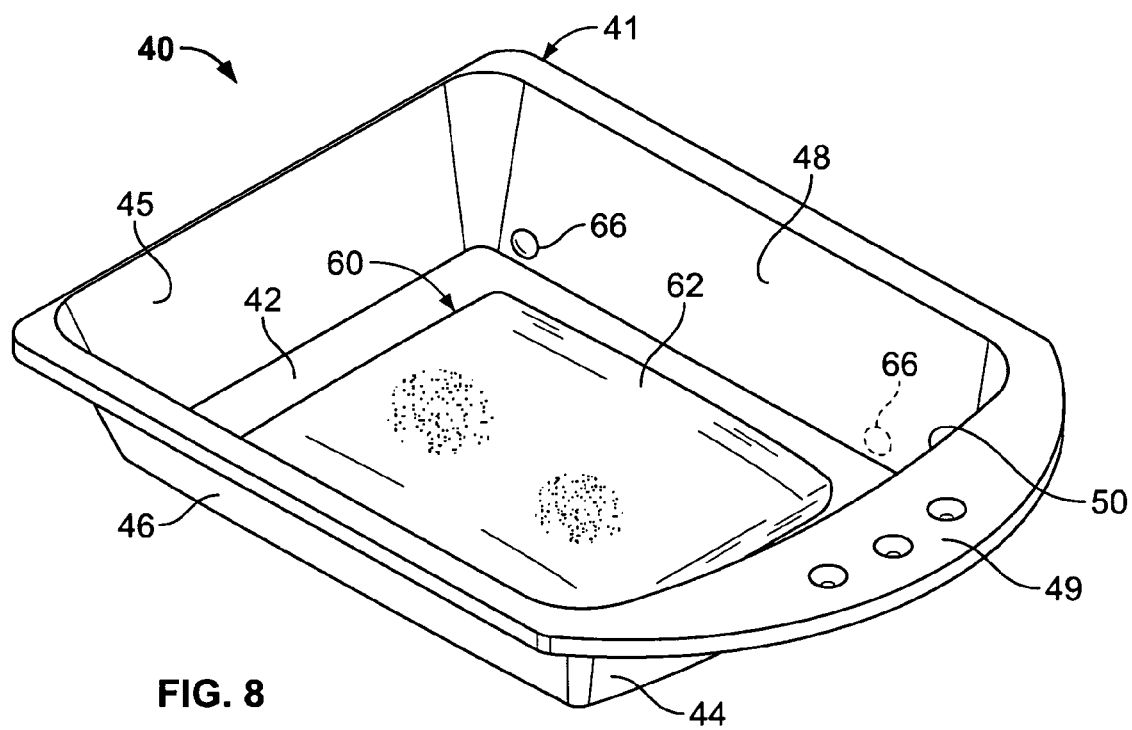
FIG. 8 is a perspective view of the disposable brew basket of FIG. 2 with a coffee filter pack provided therein.

As shown in FIG. 8, the disposable brew basket 40 may also include an integral coffee filter pack 60 comprising a liquid permeable pouch 62 (e.g., a paper filter pouch) containing an amount of ground coffee appropriate for brewing a single serving of brewed coffee. The coffee filter pack 60 is not unlike a tea bag, as it contains an amount of ground coffee that is appropriate for brewing a single serving of the beverage, and is designed to be used once and then discarded. Alternatively, a coffee filter pack containing enough ground coffee to brew more than a single serving in a single brewing operation could be used without departing from the scope of embodiments consistent with the present invention. Moreover, the disposable brew basket 40 may alternatively include an integral filter pack (not shown) containing an amount of grounds or other materials used to make other beverages, such as, but not limited to tea and/or hot chocolate.

Figure 10:
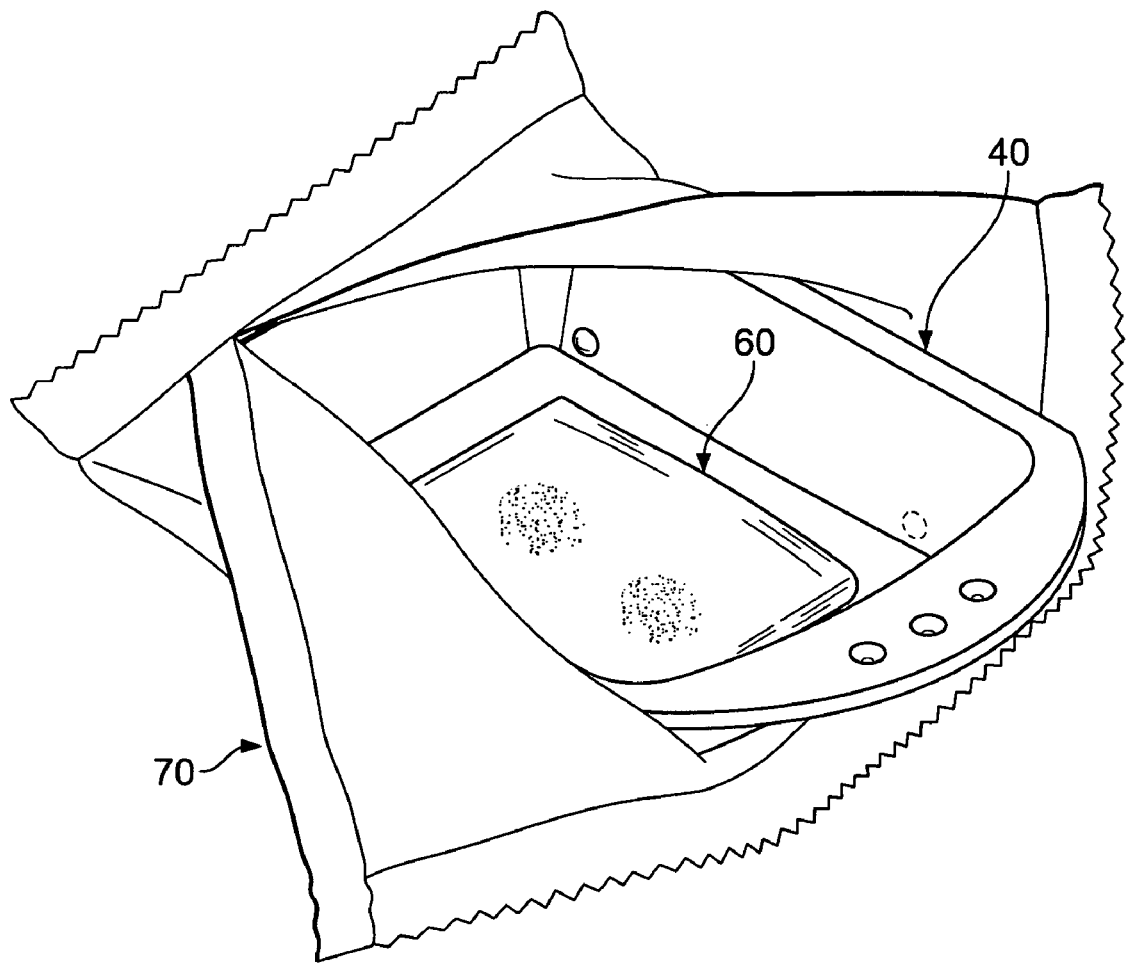
FIG. 10 is a perspective view similar to FIG. 8 showing the disposable brew basket and the coffee filter pack packaged together.
Figure 11A:
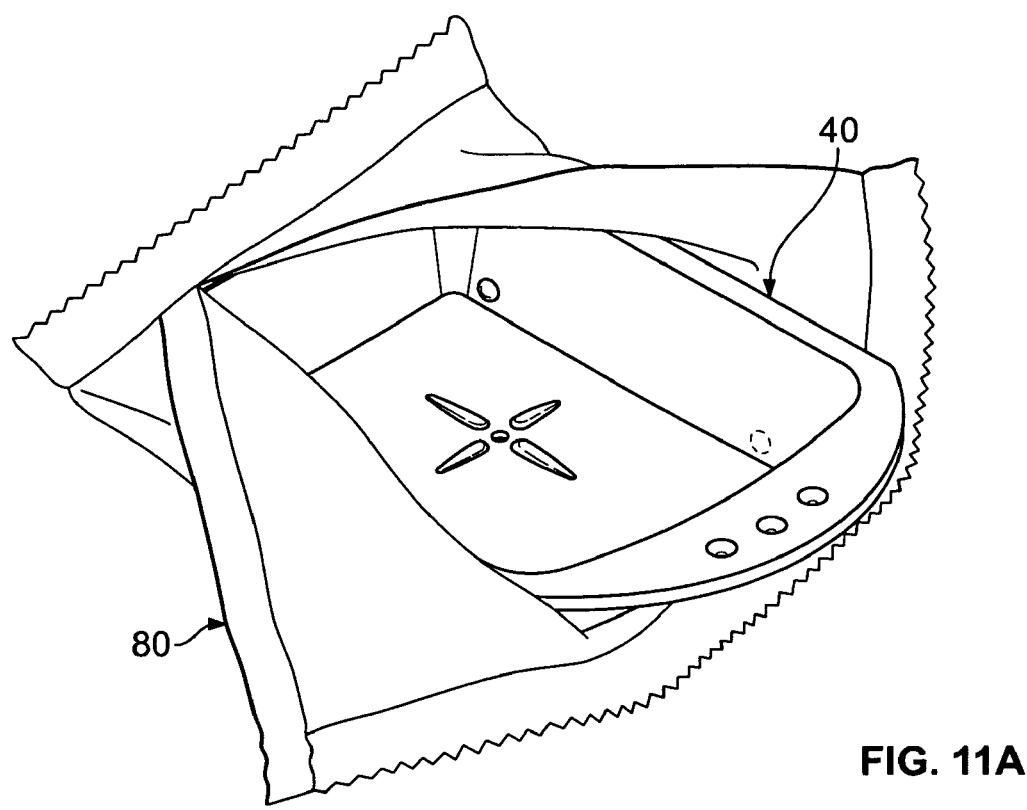
FIGS. 11a and 11b are perspective views similar to FIG. 8 showing the disposable brew basket and the coffee filter pack packaged separately.
Figure 11B:
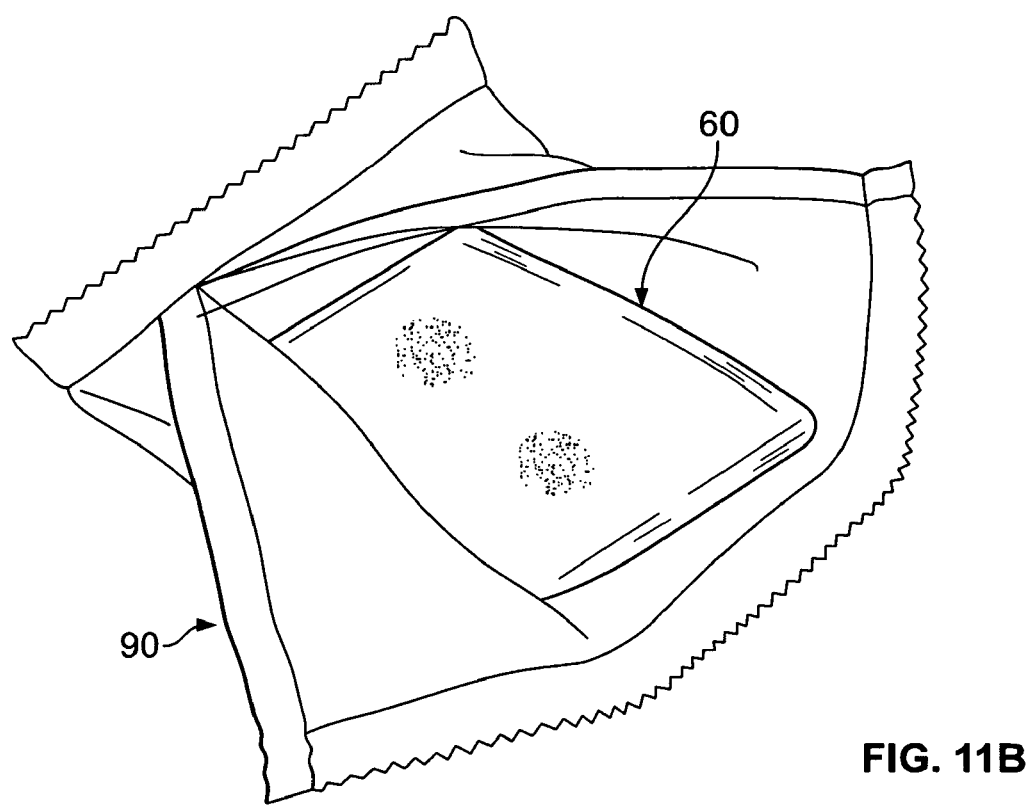

One coffee filter pack 60 and one disposable brew basket 40 may be packaged together in a package 70 as shown in FIG. 10 for use. The coffee filter pack 60 may or may not be adhered or otherwise connected to the basket 40, such as, but not limited to, the basket bottom wall 42. The disposable brew baskets 40 and the coffee filter packs 60 may also be packaged and sold separately from one another in packages 80 and 90, respectively, as shown in FIGS. 11a and 11b, respectively, without departing from the scope of embodiments consistent with the present invention.

The disposable brew baskets 40 and the coffee filter packs 60 may be packaged, whether together or separately, using any suitable packaging material(s), such as, but not limited to, paper and/or plastic. The paper, plastic, and/or other material(s) may be laminated and/or coated with any suitable material(s), such as, but not limited to, a metallic foil and/or a wax. The packaging material used to package the disposable brew baskets 40 and/or the coffee filter packs 60 may be sealed, for example, to facilitate preventing damage to, contamination of, and/or degradation of the disposable brew baskets 40 and/or the coffee filter packs 60 during storage and/or shipping. The packaging material may be sealed using any suitable structure and/or means, such as, but not limited to, heat, adhesive, compression, and/or other fastening mechanisms, such as, but not limited to, clips, string, wires, and/or fastening mechanisms that include a deformable wire (e.g., a bread tie). The packaging material may be hermetically sealed, for example, to facilitate preventing damage to, contamination of, and/or degradation of the disposable brew baskets 40 and/or the coffee filter packs 60 during storage and/or shipping. Moreover, in addition to the hermetic seal, the disposable brew baskets 40 and/or the coffee filter packs 60 may also be vacuum packaged.

Thus, in use, the disposable brew basket 40 is inserted into the basket-receiving recess 16 of the electric coffee brewing machine 10, in lieu of the reusable brew basket 18. The coffee filter pack 60 may be placed into the brewing reservoir 50 of the disposable brew basket 40, in lieu of a conventional paper filter and loose coffee grinds. In accordance with embodiments consistent with the present invention, both the disposable brew basket 40 and the coffee filter pack 60 are then discarded after use, e.g., after one brewing operation.

More specifically, a method of brewing a single serving of coffee comprises the steps of: providing an electric coffee brewing machine such as machine 10; providing a single-use, disposable brew basket 40 having a brewing reservoir 50 for receiving heated water from the electric coffee brewing machine 10; providing a coffee filter pack 60 comprising a liquid permeable pouch 62 containing ground coffee; placing the coffee filter pack 60 within the brewing reservoir 50 of the disposable brew basket 40; inserting the disposable brew basket 40 into the basket receiving recess 16 of the electric coffee brewing machine 10; brewing a single serving of coffee with the electric coffee brewing machine 10; and discarding the disposable brew basket 40 and coffee filter pack 60 after the single serving of coffee has been brewed.

A related method of embodiments consistent with the present invention comprises the steps of providing an electric coffee brewing machine 10 including a reusable brew basket 18 with a brewing reservoir; providing a disposable brew basket 40 of substantially the same dimensions as the reusable brew basket 18 of the electric coffee brewing machine 10; providing a coffee filter pack 60 comprising a liquid permeable pouch 62 containing ground coffee; placing the coffee filter pack 60 within the brewing reservoir 50 of the disposable brew basket 40; removing the reusable brew basket 18 from the electric coffee brewing machine 10 and replacing it with the disposable brew basket 40; brewing coffee with the electric coffee brewing machine 10; and discarding the disposable brew basket 40 and coffee filter pack 60 after the coffee has been brewed.

Figure 9:
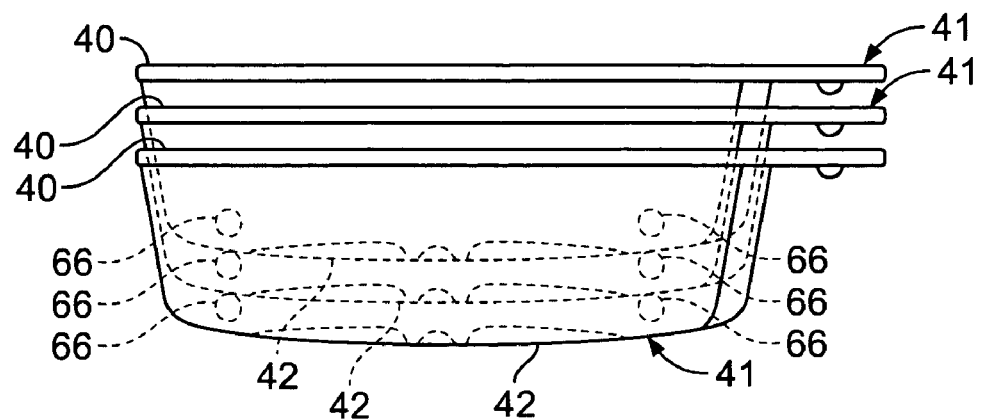
FIG. 9 is a side elevational view of a nested stack of a plurality of the disposable brew basket of FIG. 2.

As shown in FIGS. 2 through 9, the front wall 44, rear wall 45, left side wall 46 and right side wall 48 of the disposable brew basket 40 may be tapered outwardly, i.e., they may extend generally upwardly and outwardly from the perimeter of the bottom wall 42, to facilitate nesting of the disposable brew basket 40 with adjacent, aligned baskets of like configuration (see FIG. 9). This permits multiple nested disposable brew baskets 40 to be packaged (e.g., as described above with respect to individual brew baskets 40), stored and/or shipped (see FIG. 21) together at minimal cost. Alternatively, one or more walls 44, 45, 46, and/or 48 are not tapered.

As best shown in FIGS. 2 and 3, the disposable brew basket 40 may also include at least one integral spacer 66 for limiting the extent of nesting of adjacent, aligned baskets 40. The integral spacers 66 may be located on the left and/or right side walls 46 and 48 of the disposable brew basket 40, though spacers could be used on the front and/or rear walls 44 and 45 of the basket 40 without departing from the scope of embodiments consistent with the present invention. As shown in FIGS. 2 and 3, the spacer may be located on an inner surface of its associated wall of the disposable brew basket 40 and may include a projection that extends generally inwardly from its associated side wall. The projection is adapted to contact and abut against a lower surface of the bottom wall 42 of an adjacent, nesting basket 40 in a manner to space the nested baskets 40 from one another. Thus, the spacers 66 permit a plurality of the disposable brew baskets 40 to be "controllably nested" (see FIG. 9) by preventing overly tight nesting and thereby facilitating separation prior to repackaging or use.

In a stack of controllably nested, disposable brew baskets 40, the location of the spacers 66 may alternate so that the location of the spacers 66 of adjacent baskets in the stack differ from one another to prevent overly tight nesting of the baskets 40 and of the spacers 66 themselves. Each disposable brew basket 40 may include only one spacer 66. However, multiple spacers, in the same or alternating locations, could be used without departing from the scope of embodiments consistent with the present invention. The spacers 66 may be formed as a monolithic construction, as a single piece, with the remainder of the disposable brew basket body 41. Alternatively, the spacers 66 may be separately formed and thereafter permanently and rigidly secured to the brew basket body 41, for example, as described above with respect to the other portions of the disposable brew basket 40.

FIGS. 12 through 14 show an alternative embodiment of a disposable brew basket 140 consistent with the present invention. As shown in FIGS. 12 through 14, a body 141 of the brew basket 140 has a generally frustroconical shape. More specifically, the disposable brew basket 140 has a bottom wall 142, and a side wall 144 that has a generally circular cross-sectional shape. The side wall 144 extends generally upwardly from the bottom wall 142 to define a brewing reservoir 150, which has a generally circular cross-sectional shape. The side wall 144 is tapered outwardly, i.e., extends generally upwardly and outwardly from the perimeter of the bottom wall 142, such that the brew basket body 141 has the generally frustroconical shape. Alternatively, the side wall 144 is not tapered. The disposable brew basket 140 includes a lip 149 extending from the side wall 144. Alternatively, the disposable brew basket 140 does not include the lip 149.

Figure 15:
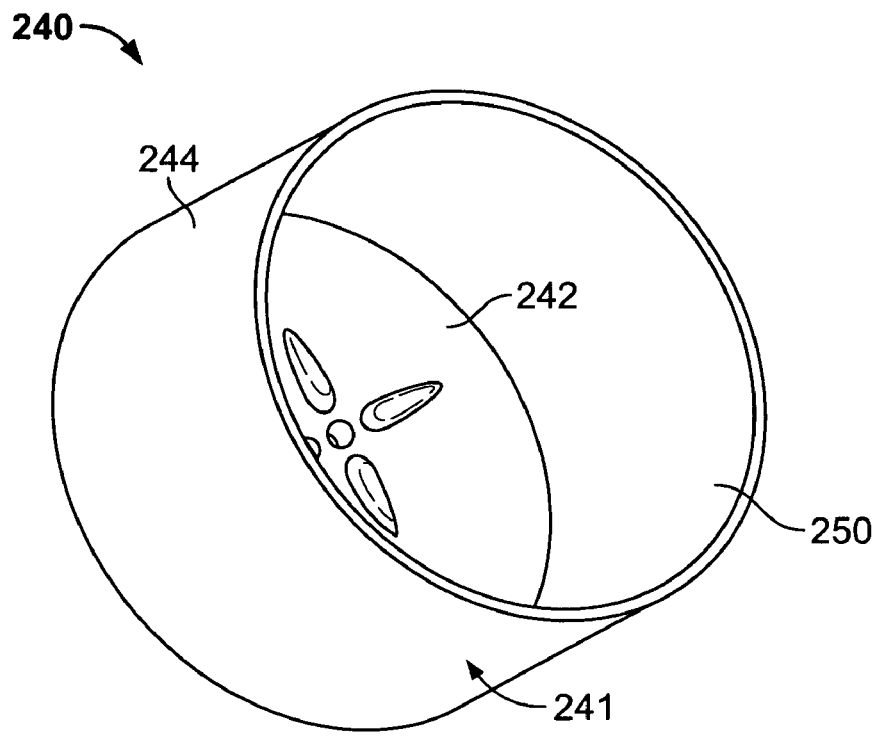
FIG. 15 is a perspective view of another alternative embodiment of a disposable brew basket consistent with the present invention.

FIG. 15 shows another alternative embodiment of a disposable brew basket 240 consistent with the present invention. A body 241 of the brew basket 240 has a generally cylindrical shape. More specifically, the disposable brew basket 240 has a bottom wall 242, and a side wall 244 that has a generally circular cross-sectional shape. The side wall 244 extends generally upwardly from the bottom wall 242 to define a brewing reservoir 250, which has a generally circular cross-sectional shape. The disposable brew basket 240 may include a lip (not shown) in alternative embodiments.

Figure 16:
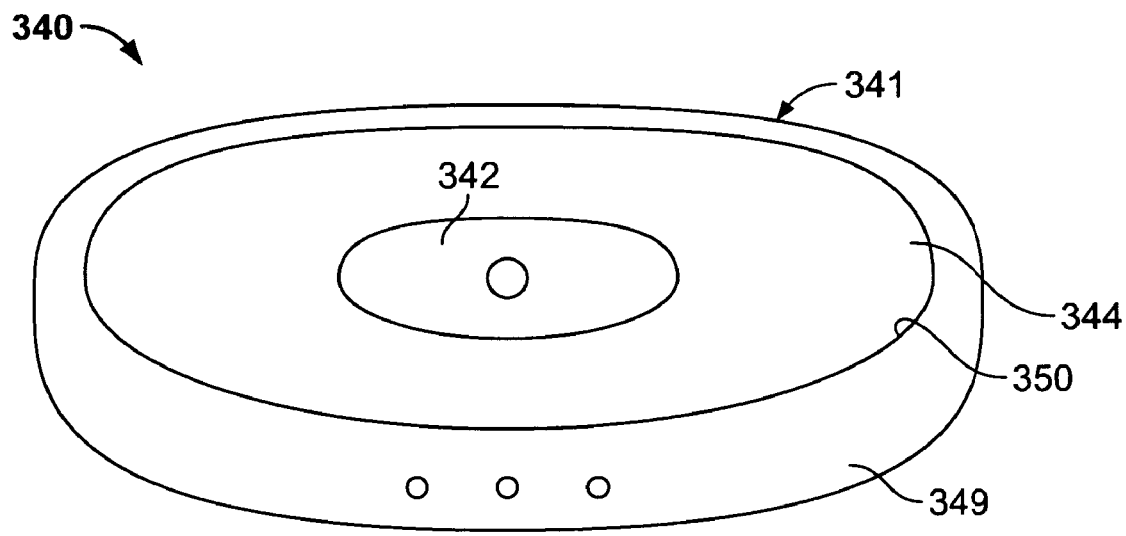
FIG. 16 is a top plan view of another alternative embodiment of a disposable brew basket consistent with the present invention.
Figure 17:
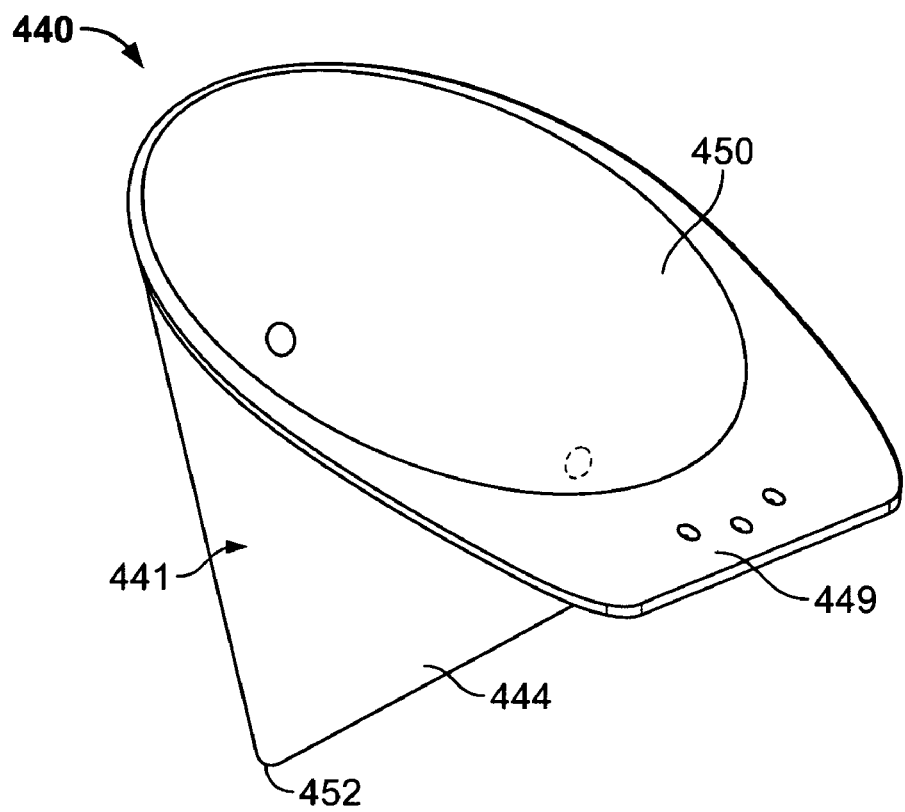
FIG. 17 is a perspective view of another alternative embodiment of a disposable brew basket consistent with the present invention.
Figure 18:
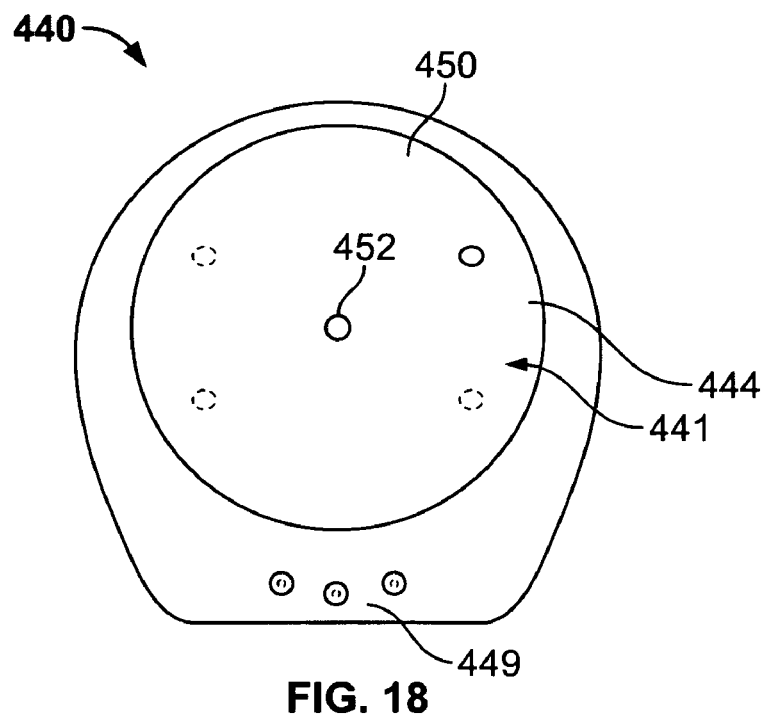
FIG. 18 is a top plan view of the disposable brew basket of FIG. 17.
Figure 19:
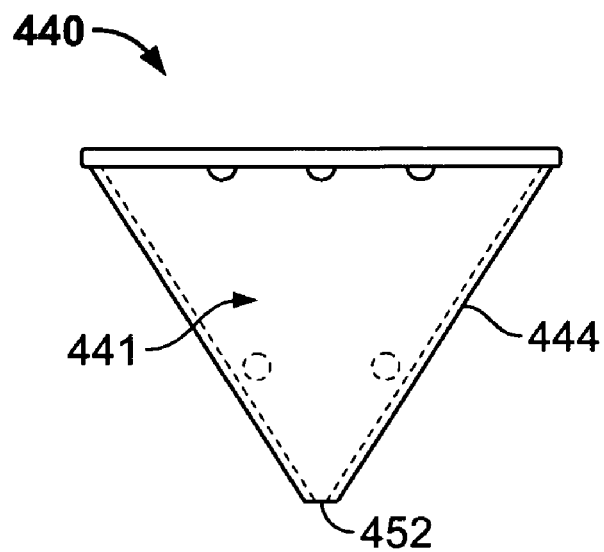
FIG. 19 is a front elevational view of the disposable brew basket of FIG. 17.
Figure 20:
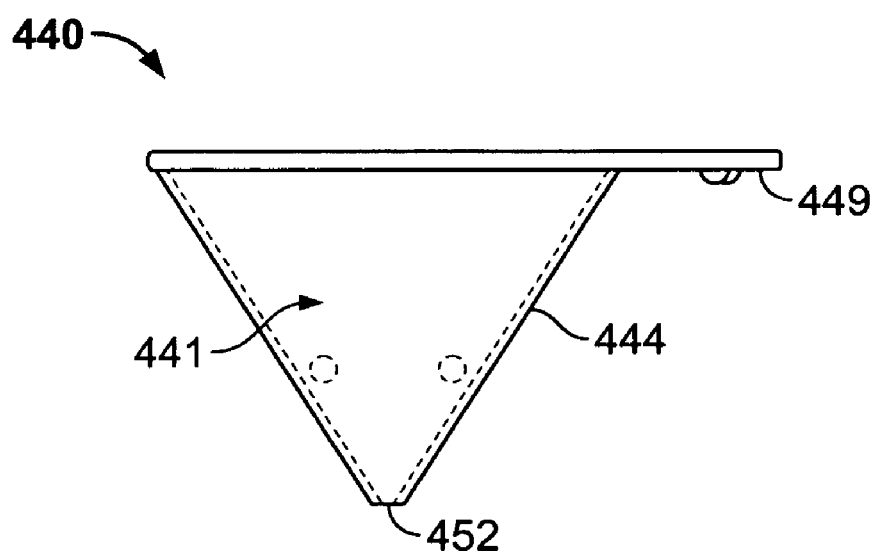
FIG. 20 is a side elevational view of the disposable brew basket of FIG. 17.

FIG. 16 shows another alternative embodiment of a disposable brew basket 340 consistent with the present invention. A body 341 of the disposable brew basket 340 includes a bottom wall 342, and a side wall 344 having a generally arcuate cross-sectional shape. Although the side wall 344 may have any arcuate cross-sectional shape that is non-circular, the side wall 344 shown in FIG. 16 has a generally oval-shaped cross section. The side wall 344 extends generally upwardly from the bottom wall 342 to define a brewing reservoir 350, which has a generally oval cross-sectional shape. The side wall 344 is tapered outwardly, i.e., extends generally upwardly and outwardly from the perimeter of the bottom wall 342. Alternatively, the side wall 344 is not tapered. The disposable brew basket 340 includes a lip 349 extending from the side wall 344. Alternatively, the disposable brew basket 340 does not include the lip 349.

Figure 21:
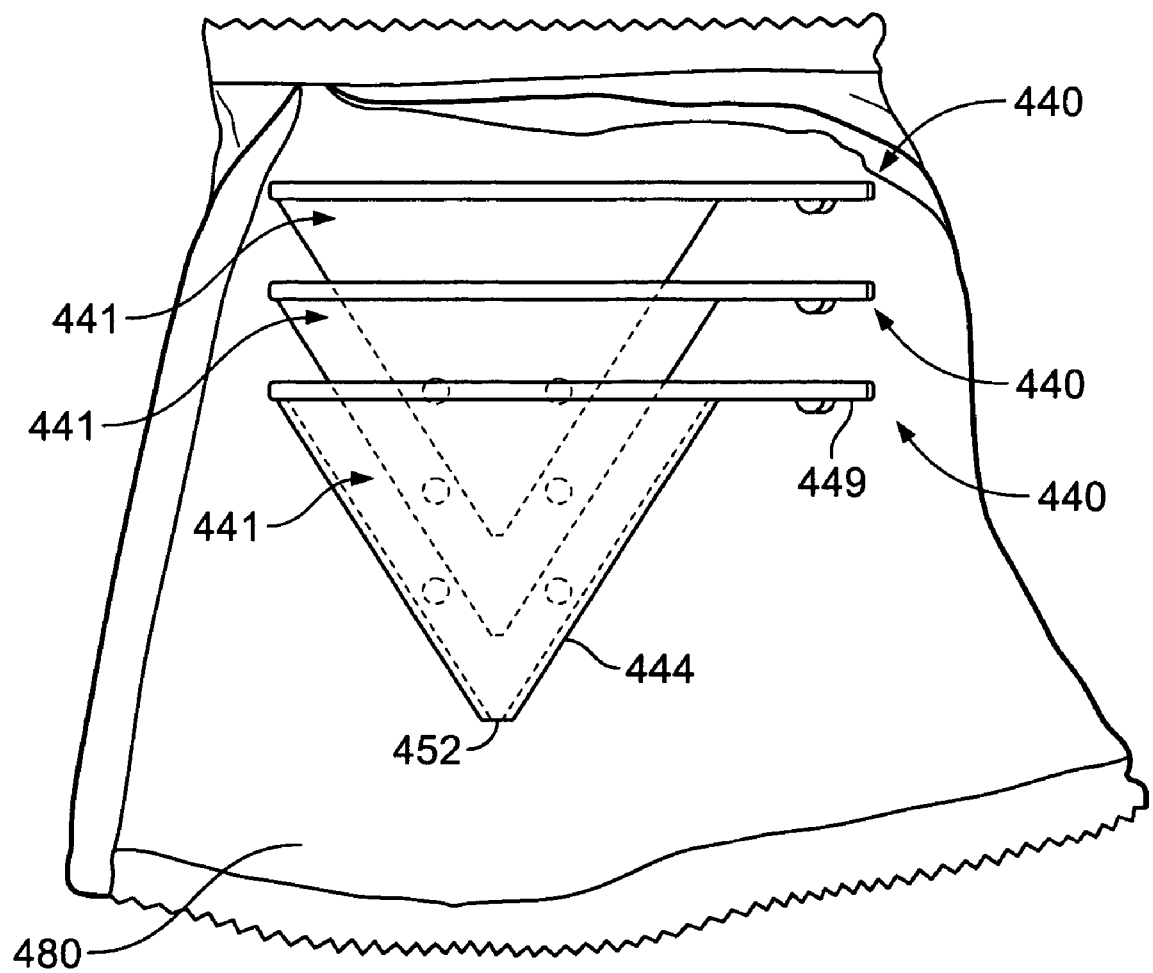
FIG. 21 is a side elevational view of a nested stack of a plurality of the disposable brew baskets of FIG. 17.

FIGS. 17 through 21 show another alternative embodiment of a disposable brew basket 440 consistent with the present invention. More specifically, a body 441 of the disposable brew basket 440 has a tapered side wall 444 that has a generally circular cross-sectional shape. The body 441 does not include a bottom wall, but rather the side wall 444 extends generally upwardly from a central opening 452 or "drip spout". As such, the body 441 has a generally conical shape. Alternatively, the side wall 444 may have any other non-circular arcuate cross-sectional shape that resembles a conical shape. The side wall 444 defines a brewing reservoir 450, which has a generally circular cross-sectional shape. The disposable brew basket 440 includes a lip 449 extending from the side wall 444. Alternatively, the disposable brew basket 440 does not include the lip 449. As shown in FIG. 21, a plurality of the disposable brew baskets 440 may be nested together and packaged in a package 480 such that a plurality of the disposable brew baskets 440 can be stored and/or shipped together.

Although the disposable brew basket embodiments are described and illustrated above with respect to the coffee brewing machine 10 shown in FIG. 1, the disposable brew basket embodiments described and illustrated herein may be used with any suitable coffee maker, such as, but not limited to, those described and illustrated below.

Figure 22:
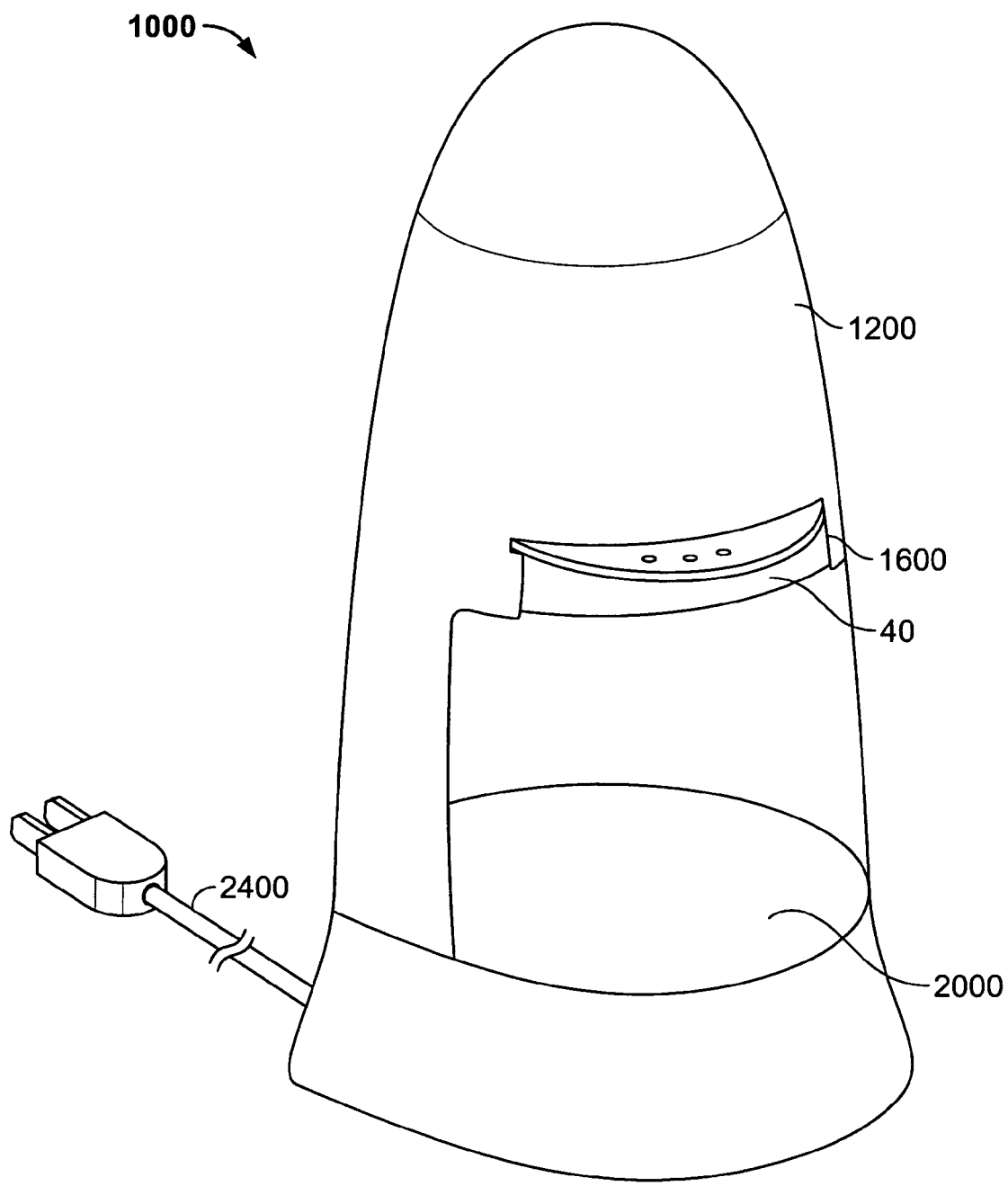
FIG. 22 is a perspective view of an alternative exemplary electric coffee brewing machine used in the practice of embodiments consistent with the present invention.

FIG. 22 is an alternative embodiment of an exemplary drip-type electric coffee brewing machine 1000 which may be used in the practice of embodiments consistent with the present invention. In general, the electric coffee brewing machine 1000 comprises an outer housing 1200, a cold water reservoir (not shown), a basket-receiving recess 1600, a receiving vessel platform 2000 for supporting a coffee-receiving vessel (not shown), and an electric power cord 2400. The outer housing 1200 may include any suitable material(s) that enables the housing 1200 to function as described herein, such as, but not limited to, plastic. As shown in FIG. 22, the disposable brew basket 40 shown in FIG. 2 is received within the basket-receiving recess 1600. However, any of the disposable brew basket embodiments shown and/or described herein may be used with the brewing machine 1000.

Figure 23:
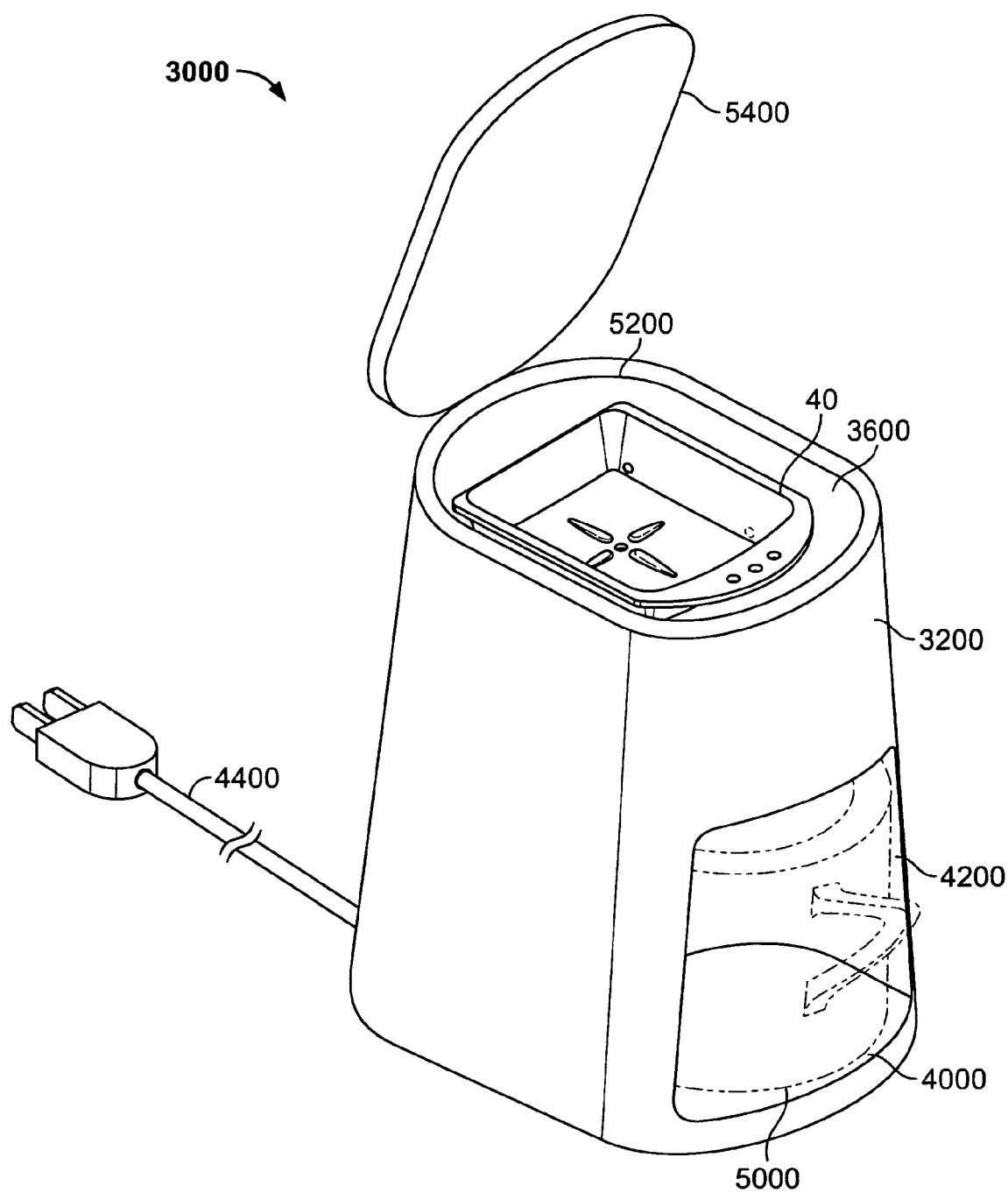
FIG. 23 is a perspective view of another alternative exemplary electric coffee brewing machine used in the practice of embodiments consistent with the present invention.

FIG. 23 is an alternative embodiment of an exemplary drip-type electric coffee brewing machine 3000 which may be used in the practice of embodiments consistent the present invention. In general, the electric coffee brewing machine 3000 comprises an outer housing 3200, a cold water reservoir (not shown), an internal cavity 3600 within the housing 3200, a receiving vessel platform 4000 for supporting a coffee-receiving vessel 5000, and an electric power cord 4400. The outer housing 3200 may include any suitable material(s) that enables the housing 3200 to function as described herein, such as, but not limited to, plastic. The brewing machine 3000 is a "top load" machine where water and ground coffee are loaded into the internal cavity 3600 of the housing 3200 through an open top 5200 of the housing 3200. A hinged or removable lid 5400 is provided to provide access to the internal cavity 3600 through the open top 5200. As shown in FIG. 23, the disposable brew basket 40 shown in FIG. 2 is received within the internal cavity 3600. However, any of the disposable brew basket embodiments shown herein may be used with the machine 3000.

It should be understood that, although at least one of the novel methods described above includes the steps of providing a reusable brew basket 18 and then removing it and replacing it with the disposable brew basket 40, there are reasons why it may be preferable to practice embodiments consistent with the present invention without these steps (i.e., without providing a reusable brew basket 18 at all), especially in the context of the hotel industry where such coffee makers are provided by hotels for daily in-room use by thousands of hotel guests. Again, the process of cleaning a reusable plastic brew basket and glass coffee pot after each use is time consuming, and failure to do so properly can not only compromise the quality and taste of the brewed coffee, but also violate health regulations. This is especially so when the coffee makers are used to brew flavored coffee, which have tastes and scents that tend to linger in the permanent brew basket and coffee pot. These are among the reasons why a disposable brew basket designed to brew directly into a coffee cup may be used in embodiments consistent with the present invention. However, in the context of the hotel industry, there are additional reasons why disposable brew baskets are preferred. For example, if the drip coffee maker 10 is provided without a permanent "reusable" brew basket 18 (either because the coffee maker is manufactured and sold without one or because the hotel management removes it before placing the coffee maker in the room), then hotel guests and staff are less likely to steal the coffee maker, which is virtually useless without a brew basket. In addition to theft deterrence, providing a "single serving" coffee maker 10 (designed to brew directly into a coffee cup as shown in FIG. 1) without a reusable brew basket 18 and without a glass coffee pot eliminates risk of injury associated with handling these components. Also, because the "single serving" coffee maker 10 may be designed to brew directly into a coffee cup, there is no need for a heating plate, which further reduces the risk of injury.

Various embodiments of a disposable brew basket are described and illustrated herein. The disposable brew basket is not limited to the particular shapes of the illustrated and described embodiments, but rather may have any suitable shape(s) that enables the disposable brew basket to function as described herein. Moreover, the disposable brew basket is not limited to the particular locations of the illustrated and described embodiments at which the disposable brew basket is loaded into a brewing machine (which include, for example, loading through the front or top of a brew machine), but rather may loaded into the brewing machine at any suitable location thereof.

In view of the foregoing, it can be seen that the several objects of embodiments consistent with the present invention are achieved and attained. The embodiments disclosed herein were chosen and described in order to best explain the principles of embodiments consistent with the present invention and its practical application to thereby enable others skilled in the art to best utilize the invention in various embodiments and with various modifications as are suited to the particular use contemplated. As various modifications could be made in the constructions and methods herein described and illustrated without departing from the scope of embodiments consistent with the present invention, it is intended that all matter contained in the foregoing description or shown in the accompanying drawings shall be interpreted as illustrative rather than limiting. Thus, the breath and scope of the embodiments consistent with the present invention should not be limited by any of the above-described exemplary embodiments, but should be defined only in accordance with the following claims appended thereto and their equivalents.

While the invention has been described in terms of various specific embodiments, those skilled in the art will recognize that the invention can be practiced with modification within the spirit and scope of the claims.

What is claimed is:

1. Apparatus for use in an in-room beverage brewing system for a room of a lodging establishment, the beverage brewing system to be used by a number of different lodging guests expected to stay in the room over a period of time, the apparatus comprising:

a plurality of single serving disposable brew baskets comprising a body defining a brewing reservoir, the body being formed with a disposable rigid construction, the body having an opening therethrough to permit a brewed beverage to flow from the brewing reservoir of the disposable brew basket into a beverage container, the body extending upwardly from a bottom of the brewing reservoir to an open top that is configured to receive heated water from the brewing machine, the heated water flowing through the open top during a brewing operation, the brewing reservoir having a size dimensioned appropriate to make approximately only a single serving of beverage during a brewing operation, a brewing area being sufficiently large to hold a filter pack and the heated water while brewing without a level of the heated water rising above and overflowing the open top, wherein the plurality of disposable brew baskets comprise a number of the brew baskets relating to the number of different lodging guests expected to stay at the lodging establishment over the period of time.

2. The apparatus of claim 1, wherein the body comprises a metal.

3. The apparatus of claim 2, wherein the body is stamped from a sheet of metal.

4. The apparatus of claim 1, wherein the body comprises aluminum.

5. The apparatus of claim 1, wherein the body comprises a metallic foil laminated with another material.

6. The apparatus of claim 5, wherein the metallic foil is laminated with at least one of paper or plastic.

7. The apparatus of claim 1, wherein the body comprises paper that is at least one of at least partially impregnated or at least partially coated with another material.

8. The apparatus of claim 7, wherein the paper is at least one of at least partially impregnated or at least partially coated with at least one of wax and plastic.

9. The apparatus of claim 1, wherein the body comprises a thermoplastic.

10. The apparatus of claim 9, wherein the body comprises at least one of acrylonitrile butadiene styrene (ABS), acrylic, celluloid, ethylene vinyl alcohol (EVAL), a fluoroplastic, an ionomer, a liquid crystal polymer (LCP), polyacetal (POM), a polyacrylate, polyamide (PA), polyamide-imide (PAI), polyaryletherketone (PAEK), polybutylene terephthalate (PBT), polyethylene terephthalate (PET), polycarbonate (PC), polyketone (PK), polyester, polyethylene, polyetheretherketone (PEEK), polyetherimide (PEI), polysulfone, polyimide (PI), polylactic acid (PLA), polypropylene (PP), polystyrene (PS), polysulfone (PSU), and polyvinyl chloride (PVC).

11. The apparatus of claim 1, wherein the body comprises at least one of an expanded polymer or an extruded polymer.

12. The apparatus of claim 11, wherein the body comprises expanded polystyrene.

13. The apparatus of claim 11, wherein the body comprises extruded polystyrene.

14. The apparatus of claim 1, wherein the body comprises a thermoset.

15. The apparatus of claim 14, wherein the body comprises at least one of phenol formaldehyde resin, duroplast, polyester resin, or epoxy resin.

16. The apparatus of claim 1, wherein the body comprises a front wall, a rear wall, a left side wall, and a right side wall arranged in a generally rectangular shape.

17. The apparatus of claim 16, wherein the front wall, rear wall, left side wall, and right side wall each extend upwardly from a bottom wall that defines the brewing reservoir bottom.

18. The apparatus of claim 16, wherein the front wall, rear wall, left side wall, and right side wall are generally the same length and are arranged in a generally square shape.

19. The apparatus of claim 1, wherein the body comprises one of a generally frustroconical shape and a generally cylindrical shape.

20. The apparatus of claim 19, wherein the body comprises a side wall having a generally circular cross-sectional shape.

21. The apparatus of claim 20, wherein the side wall extends upwardly from a bottom wall that defines the brewing reservoir bottom.

22. The apparatus of claim 1, wherein the body comprises a side wall having a generally non-circular arcuate cross-sectional shape.

23. The apparatus of claim 22, wherein the side wall extends upwardly from a bottom wall that defines the brewing reservoir bottom.

24. The apparatus of claim 1, wherein the body comprises a generally conical shape.

25. The apparatus of claim 1, further comprising:
packaging that includes at least first and second packages,
the first package including at least one of the brew baskets and the second package including at least another of the brew baskets,
the first and second packages being separate from one another.

26. The apparatus of claim 1, further comprising:
a plurality of filter packs for use with the beverage brewing machine,
the filter packs containing an amount of grinds sufficient to brew approximately only a single serving of brewed beverage.

27. The apparatus of claim 26, further comprising:
packaging that includes at least first and second packages,
the first package including at least one of the brew baskets and
the second package including at least one of the filter packs,
the first and second packages being separate from one another.

28. A beverage brewing system, comprising:
a beverage brewing machine having a housing, a water reservoir, and a location to receive a brew basket, the brewing machine heating water from the water reservoir;
a plurality of filter packs, the filter packs containing an amount of grinds sufficient to brew approximately only a single serving of beverage;
a plurality of single serving disposable brew baskets utilized with the beverage brewing machine during separate brewing operations, the brew baskets being individually inserted into the location during an associated brewing operation, the brew baskets comprising a body defining a brewing reservoir, the body being formed with a disposable rigid construction, the body having an opening therethrough to permit a brewed beverage to flow from the brewing reservoir of the disposable brew basket into a beverage container, the body extending upwardly from a bottom of the brewing reservoir to an open top that is configured to receive heated water from the brewing machine, the heated water flowing through the open top during a brewing operation, the brewing reservoir having a size dimensioned appropriate to make approximately only a single serving of beverage during a single brewing operation, and a brewing area being sufficiently large to hold at least one of the filter packs and the heated water while brewing without a level of the heated water rising above and overflowing the open top; and packaging that includes at least first and second packages, the first package including at least one of the brew baskets and the second package including at least another of the brew baskets, the first and second packages being separate from one another.

29. The system of claim 28, wherein the body of each brew basket comprises a metal.

30. The system of claim 29, wherein the body of each brew basket is stamped from a sheet of metal.

31. The system of claim 28, wherein the body of each brew basket comprises aluminum.

32. The system of claim 28, wherein the body of each brew basket comprises a metallic foil laminated with another material.

33. The system of claim 32, wherein the metallic foil is laminated with at least one of paper and plastic.

34. The system of claim 28, wherein the body of each brew basket comprises paper that is at least one of at least partially impregnated and at least partially coated with another material.

35. The system of claim 34, wherein the paper is at least one of at least partially impregnated or at least partially coated with at least one of wax and plastic.

36. The system of claim 28, wherein the body of each brew basket comprises a thermoplastic.

37. The system of claim 30, wherein the body of each brew basket comprises at least one of acrylonitrile butadiene styrene (ABS), acrylic, celluloid, ethylene vinyl alcohol (EVAL), a fluoroplastic, an ionomer, a liquid crystal polymer (LCP), polyacetal (POM), a polyacrylate, polyamide (PA), polyamide-imide (PAI), polyaryletherketone (PAEK), polybutylene terephthalate (PBT), polyethylene terephthalate (PET), polycarbonate (PC), polyketone (PK), polyester, polyethylene, polyetheretherketone (PEEK), polyetherimide (PEI), polysulfone, polyimide (PI), polylactic acid (PLA), polypropylene (PP), polystyrene (PS), polysulfone (PSU), and polyvinyl chloride (PVC).

38. The system of claim 28, wherein the body of each brew basket comprises at least one of an expanded polymer and an extruded polymer.

39. The system of claim 38, wherein the body of each brew basket comprises expanded polystyrene.

40. The system of claim 38, wherein the body of each brew basket comprises extruded polystyrene.

41. The system of claim 28, wherein the body of each brew basket comprises a thermoset.

42. The system of claim 41, wherein the body of each brew basket comprises at least one of phenol formaldehyde resin, duroplast, polyester resin, or epoxy resin.

43. The system of claim 28, wherein the body of each brew basket comprises a front wall, a rear wall, a left side wall, and a right side wall arranged in a generally rectangular shape.

44. The system of claim 43, wherein the front wall, rear wall, left side wall, and right side wall each extend upwardly from a bottom wall that defines the brewing reservoir bottom.

45. The system of claim 43, wherein the front wall, rear wall, left side wall, and right side wall are generally the same length and are arranged in a generally square shape.

46. The system of claim 28, wherein the body of each brew basket comprises one of a generally frustroconical shape and a generally cylindrical shape.

47. The system of claim 46, wherein the body of each brew basket comprises a side wall having a generally circular cross-sectional shape.

48. The system of claim 47, wherein the side wall extends upwardly from a bottom wall that defines the brewing reservoir bottom.

49. The system of claim 28, wherein the body of each brew basket comprises a side wall having a generally non-circular arcuate cross-sectional shape.

50. The system of claim 49, wherein the side wall extends upwardly from a bottom wall that defines the brewing reservoir bottom.

51. The system of claim 28, wherein the body of each brew basket comprises a generally conical shape.

52. The beverage brewing system of claim 28, further comprising:

packaging that includes at least first and second packages, the first package including at least one of the brew baskets and the second package including at least one of the filter packs, the first and second packages being separate from one another.

53. A beverage brewing system, comprising:

a beverage brewing machine having a housing, a water reservoir, an electrical heating element for heating water, and a location to receive a single serving beverage container, the brewing machine heating water from the water reservoir; and a plurality of disposable brewing reservoirs for use with the beverage brewing machine, the plurality of disposable brewing reservoirs being individually insertable into the beverage brewing machine, the brewing reservoirs comprising:

a body formed with a one-piece construction and sized sufficiently large to hold an amount of grinds to brew approximately only a single serving of brewed beverage, an open top on the body; and a port through a bottom of the body to permit a brewed beverage to flow from the brewing reservoir into a single serving beverage container positioned at the location:

wherein the beverage brewing machine and the plurality of disposable brewing reservoirs are configured to be utilized in a room at a lodging establishment by a number of different lodging guests expected to stay in the room over a period of time, and wherein the plurality of disposable brewing reservoirs comprise a number of brewing reservoirs relating to a number of different lodging guests expected to stay at the lodging establishment over the period of time.

54. The beverage brewing system of claim 53, wherein the plurality of disposable brewing reservoirs comprise a number of brewing reservoirs relating to a number of expected uses of the beverage brewing machine over a predetermined period of time.

55. The beverage brewing system of claim 53, further comprising:

a plurality of the beverage brewing machines, wherein the plurality of disposable brewing reservoirs include multiple brewing reservoirs for use with the beverage brewing machines.

56. The beverage brewing system of claim 53, further comprising:

a plurality of filter packs for use with the beverage brewing machine, each filter pack containing the amount of grinds sufficient to brew approximately only a single serving of brewed beverage.

57. The beverage brewing system of claim 56, further comprising:
packaging that includes at least first and second packages, the first package including at least one of the brewing reservoirs and
the second package including at least one of the filter packs,
the first and second packages being separate from one another.

58. The beverage brewing system of claim 53, wherein the beverage brewing machine includes a flat un-heated platform defining the location.

59. The beverage brewing system of claim 53, wherein the brewing reservoirs are held in the brewing machine directly above the location that receives the single serving beverage container.

60. The beverage brewing system of claim 53, wherein the bottom of the brewing reservoir is spaced above the location that receives the single serving beverage container by a distance corresponding to a height of the single serving beverage container.

61. The beverage brewing system of claim 53, wherein the open top permits a user to place grinds in the brewing reservoir before the brewing operation.

62. The beverage brewing system of claim 53, wherein the brewing reservoir has upper edges molded in the one-piece construction to laterally extending flanges configured to hold the brewing reservoir in a recess in the brewing machine.

63. A beverage brewing system, comprising:
a beverage brewing machine having a housing, a water reservoir, an electrical heating element for heating water, and a location to receive a single serving beverage container, the brewing machine heating water from the water reservoir; and
a plurality of disposable brewing reservoirs for use with the beverage brewing machine, the plurality of disposable brewing reservoirs being individually insertable into the beverage brewing machine, the brewing reservoirs comprising:
a body formed with a one-piece construction and sized sufficiently large to hold an amount of grinds to brew approximately only a single serving of brewed beverage,
an open top on the body; and
a port through a bottom of the body to permit a brewed beverage to flow from the brewing reservoir into a single serving beverage container positioned at the location;
packaging that includes at least first and second packages, the first package including at least one of the brewing reservoirs and the second package including at least another of the brewing reservoirs,
the first and second packages being separate from one another.

64. An in-room beverage system for a room of a lodging establishment, the system to be used by a number of different lodging guests expected to stay in the room over a period of time, the system comprising:
a beverage brewing machine configured to be utilized in the room,
the beverage brewing machine having a housing, a water reservoir, an electrical heating element for heating water, and a location to receive a single serving beverage container,
the brewing machine heating water from the water reservoir; and
a plurality of disposable brewing reservoirs for use with the beverage brewing machine,
the plurality of disposable brewing reservoirs being individually insertable into the beverage brewing machine, the brewing reservoirs comprising:
a body formed with a one-piece construction,
the body sized sufficiently large to hold an amount of grinds to brew approximately only a single serving of brewed beverage,
an open top on the body; and
a port through a bottom of the body to permit a brewed beverage to flow from the brewing reservoir into a single serving beverage container located proximate to the beverage brewing machine;
wherein the plurality of disposable brewing reservoirs comprise a number of the brewing reservoirs relating to the number of different lodging guests expected to stay at the lodging establishment over the period of time.

65. The beverage brewing system of claim 64, wherein the plurality of disposable brewing reservoirs comprise a number of brewing reservoirs relating to a number of expected uses of the beverage brewing machine over a predetermined period of time.

66. The beverage brewing system of claim 64, further comprising:
a plurality of the beverage brewing machines,
wherein the plurality of disposable brewing reservoirs include multiple brewing reservoirs for use with the beverage brewing machines.

67. The beverage brewing system of claim 64, further comprising:
packaging that includes at least first and second packages, the first package including at least one of the brewing reservoirs and the second package including at least another of the brewing reservoirs,
the first and second packages being separate from one another.

68. The beverage brewing system of claim 64, further comprising:
a plurality of filter packs for use with the beverage brewing machine,
the filter packs containing the amount of grinds sufficient to brew approximately only a single serving of brewed beverage.

69. The beverage brewing system of claim 68, further comprising:
packaging that includes at least first and second packages, the first package including at least one of the brewing reservoirs and
the second package including at least one of the filter packs,
the first and second packages being separate from one another.

70. The beverage brewing system of claim 64, wherein the brewing reservoirs are held in the brewing machine directly above the location that receives the single serving beverage container.

71. The beverage brewing system of claim 64, wherein the bottom of the brewing reservoir is spaced above the location that receives the single serving beverage container by a distance corresponding to a height of the single serving beverage container.

72. The beverage brewing system of claim 64, wherein the open top permits a user to place grinds in the brewing reservoir before the brewing operation.

73. The beverage brewing system of claim 64, wherein the brewing reservoir has upper edges molded in the one-piece construction to laterally extending flanges configured to hold the brewing reservoir in a recess in the brewing machine.

* * * * *